United States Patent
Kim et al.

(10) Patent No.: US 10,824,325 B2
(45) Date of Patent: Nov. 3, 2020

(54) ELECTRONIC DEVICE AND METHOD OF RECOGNIZING TOUCHES IN THE ELECTRONIC DEVICE

(71) Applicant: Samsung Electronics Co., Ltd., Gyeonggi-do (KR)

(72) Inventors: Minkyu Kim, Gyeonggi-do (KR); Daeyoung Ryu, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 240 days.

(21) Appl. No.: 15/668,278

(22) Filed: Aug. 3, 2017

(65) Prior Publication Data
US 2018/0039392 A1    Feb. 8, 2018

(30) Foreign Application Priority Data
Aug. 3, 2016   (KR) .................. 10-2016-0099048

(51) Int. Cl.
*G06F 3/0488*   (2013.01)
*G06F 3/0484*   (2013.01)
(Continued)

(52) U.S. Cl.
CPC ............ *G06F 3/0488* (2013.01); *G06F 3/044* (2013.01); *G06F 3/0414* (2013.01);
(Continued)

(58) Field of Classification Search
CPC .. G06F 3/04817; G06F 3/0488; G06F 3/0418; G06F 3/04816
See application file for complete search history.

(56) References Cited

U.S. PATENT DOCUMENTS 9,639,265 B2 *  5/2017  Peterson ............. G06F 3/04886
2012/0212420 A1   8/2012  Shin
(Continued)

FOREIGN PATENT DOCUMENTS

CN   105487775   4/2016
EP   2 508 964   10/2012
(Continued)

OTHER PUBLICATIONS

International Search Report dated Nov. 20, 2017 issued in counterpart application No. PCT/KR2017/008295, 3 pages.
(Continued)

*Primary Examiner* — Kenneth Bukowski
(74) *Attorney, Agent, or Firm* — The Farrell Law Firm, P.C.

(57) ABSTRACT

An electronic device is provided. The electronic device includes a touch screen display, a processor electrically connected to the touch screen display and configured to receive a touch input applied to the touch screen display, detect a first location of the received touch input on the touch screen display, set an area related to the first detected location on the touch screen display, based on at least one condition, detect, if the received touch input is released, a second location on the touch screen display from which the touch input is released, determine whether the second detected location is within the set area, and if it is determined that the second detected location is within the set area, determine whether at least one function is executed.

17 Claims, 34 Drawing Sheets

(51) Int. Cl.
  *G06F 3/0482* (2013.01)
  *G06F 3/041* (2006.01)
  *G06F 3/044* (2006.01)
  *G04G 21/08* (2010.01)

(52) U.S. Cl.
  CPC .......... *G06F 3/0416* (2013.01); *G06F 3/0418* (2013.01); *G06F 3/0482* (2013.01); *G06F 3/04842* (2013.01); *G06F 3/04883* (2013.01); *G06F 3/04886* (2013.01); *G04G 21/08* (2013.01); *G06F 2203/04105* (2013.01)

(56) References Cited

U.S. PATENT DOCUMENTS

| | | | |
|---|---|---|---|
| 2012/0229409 A1* | 9/2012 | Ohashi | G06F 3/0416 345/173 |
| 2014/0062889 A1 | 3/2014 | Kang et al. | |
| 2014/0149903 A1* | 5/2014 | Ahn | G06F 3/0488 715/765 |
| 2014/0232678 A1 | 8/2014 | Noda | |
| 2015/0177945 A1* | 6/2015 | Sengupta | G06F 3/0488 715/744 |
| 2015/0195452 A1* | 7/2015 | Saito | G06F 3/0488 348/333.02 |

FOREIGN PATENT DOCUMENTS

| | | |
|---|---|---|
| EP | 2 765 489 | 8/2014 |
| JP | 11-175212 | 7/1999 |
| JP | 2008310522 | 12/2008 |
| JP | 2011-238294 | 11/2011 |
| JP | 2012-133718 | 7/2012 |
| JP | 201373484 | 4/2013 |
| JP | 2014-215639 | 11/2014 |
| KR | 1020140089812 | 7/2014 |
| WO | WO 2009/119716 | 10/2009 |

OTHER PUBLICATIONS

European Search Report dated Mar. 25, 2019 issued in counterpart application No. 17837221.5-1231, 9 pages.

* cited by examiner

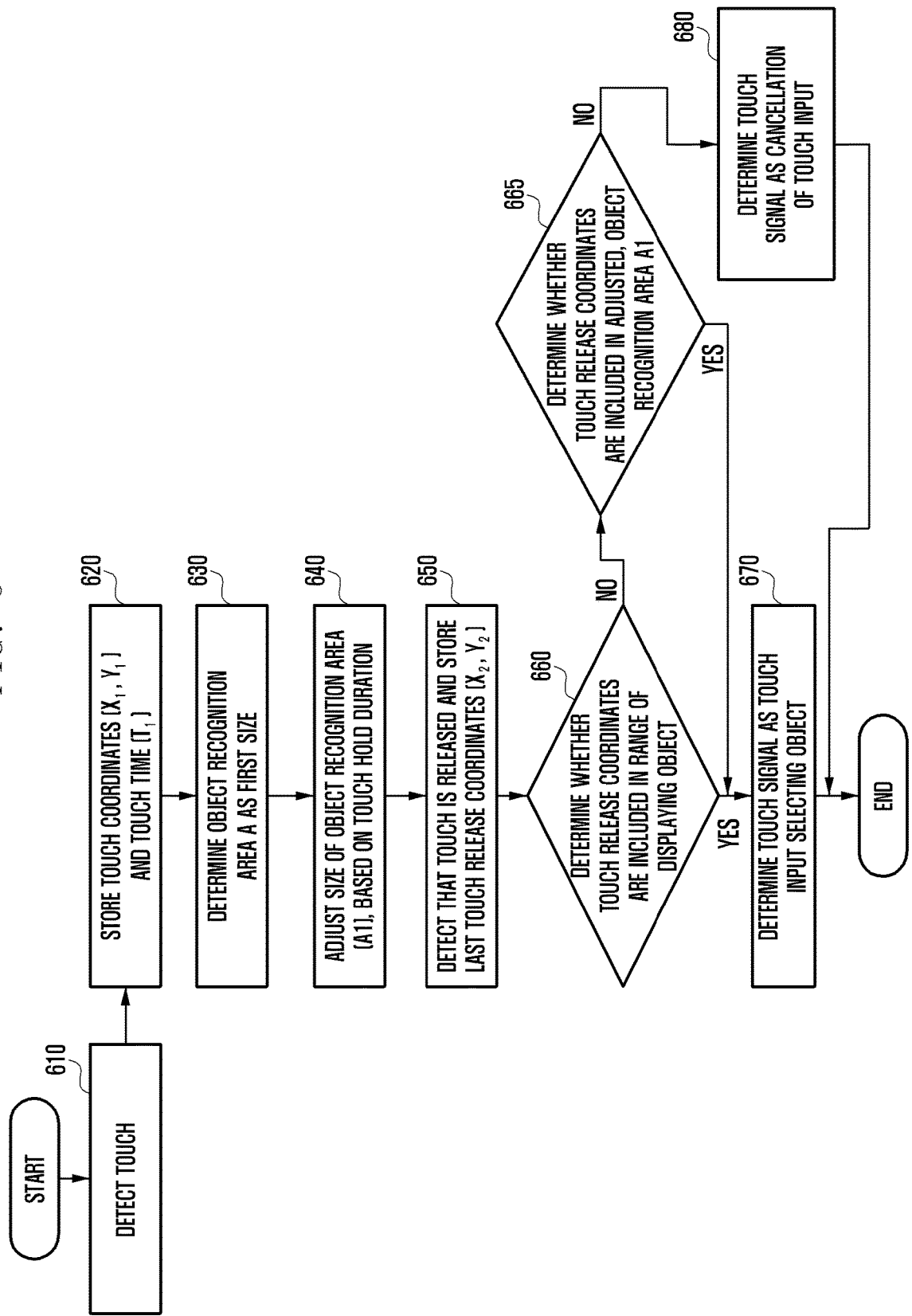

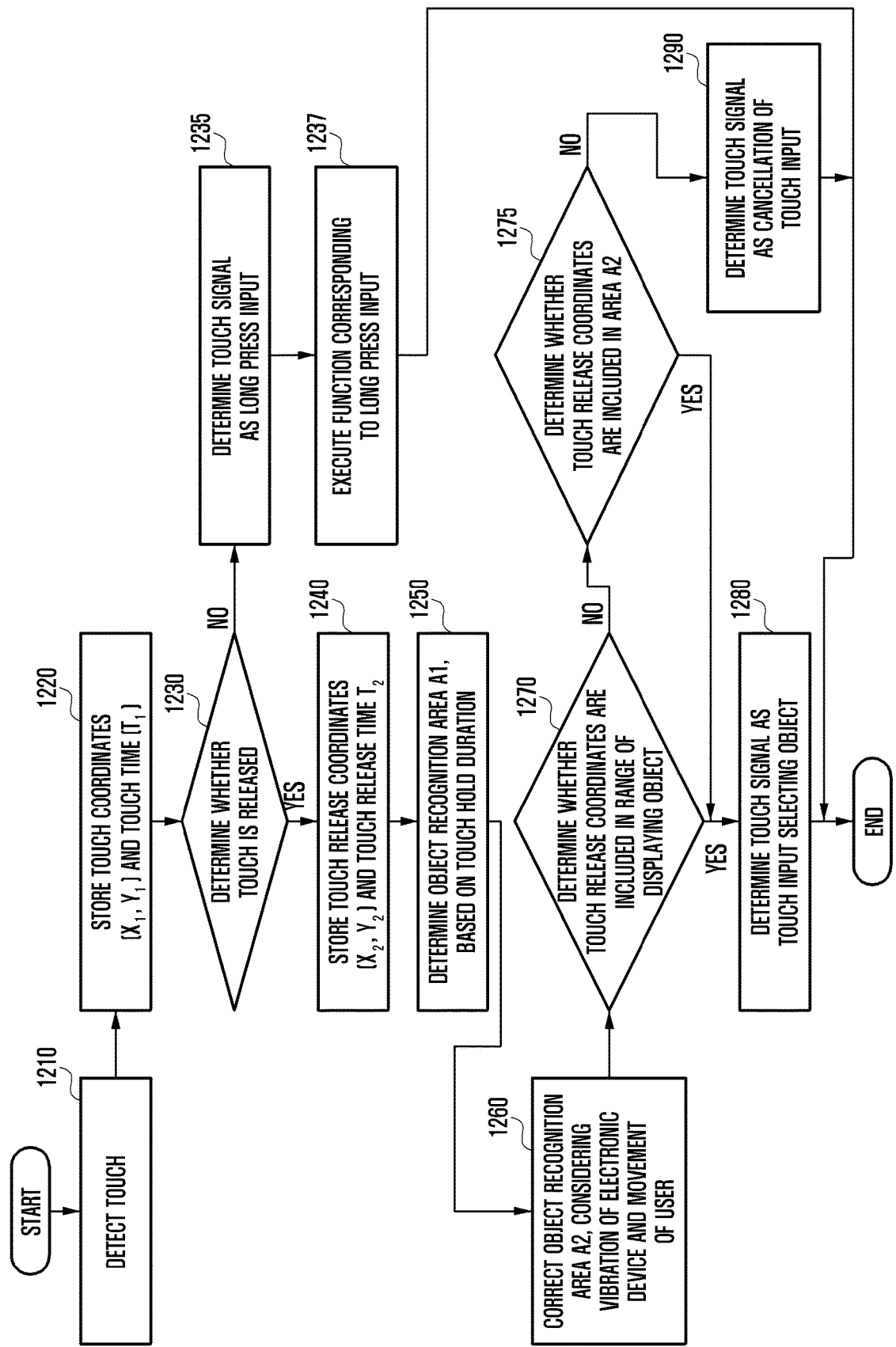

ELECTRONIC DEVICE AND METHOD OF RECOGNIZING TOUCHES IN THE ELECTRONIC DEVICE

PRIORITY

This application claims priority under 35 U.S.C. § 119(a) to Korean Patent Application Serial No. 10-2016-0099048, which was filed in the Korean Intellectual Property Office on Aug. 3, 2016, the entire content of which is incorporated herein by reference.

BACKGROUND

1. Field of the Disclosure

The present disclosure relates to an electronic device, and more particularly, to an electronic device with a touch screen and a method of recognizing touches using the electronic device.

2. Description of Related Art

Touch screens are input/output interfaces that are installed on electronic devices. Electronic devices with a touch screen are capable of recognizing a touch signal selecting a graphic user interface (GUI) object (e.g., icon, button, text, etc.) displayed on a display of the electronic devices, and activating the GUI object in response to the recognized touch signal. If an electronic device ascertains that a touch signal selecting an object gets out of an area where an object is displayed, the electronic device may recognize that the touch signal is an input for canceling a touch gesture that has selected the object.

If handheld electronic devices (e.g., smartphones, wearable devices, etc.) display objects (e.g., buttons, icons, menu lists, etc.) on the touch screen, they may have difficulty displaying the objects as a result of a size of the objects relative to a size of the touch screen. If an object (e.g., button, icon, etc.) is decreased in size to a certain size (or less), the electronic device may recognize this motion as a touch input that selects an object, when this was not the user's intent. For example, if users or their electronic devices are moving, the electronic device may not correctly recognize a touch signal for selecting a GUI object regardless of a user's intent, and thus may recognize the touch signal as a cancel input.

Therefore, a need exists to minimize errors in a touch operation or to improve touch recognition efficiency in electronic devices.

SUMMARY

The present disclosure has been made to address at least the disadvantages described above and to provide at least the advantages described below. Accordingly, an aspect of the present disclosure provides a touch recognition method capable of correctly recognizing an object selected according to a user's intent and preventing a touch input from being cancelled, against a user's intent, and an electronic device adapted to the method.

Another aspect of the present disclosure provides a touch recognition method capable of increasing the recognition efficiency of touch inputs, based on a period of time during in which a touch is held (a touch hold duration) and a user's intent, and an electronic device adapted to the method.

In accordance with an aspect of the present disclosure, there is provided an electronic device. The electronic device includes a touch screen display, a processor electrically connected to the touch screen display and configured to, receive a touch input applied to the touch screen display, detect a first location of the received touch input on the touch screen display, set an area related to the first detected location on the touch screen display, based on at least one condition, detect, if the received touch input is released, a second location on the touch screen display from which the touch input is released, determine whether the second detected location is within the set area, and if it is determined that the second detected location is within the set area, determine whether at least one function is executed.

In accordance with another aspect of the present disclosure, there is provided a method of recognizing a touch input in an electronic device. The method includes receiving a touch input for selecting an object displayed on a touch screen display of the electronic device, detecting a first location corresponding to the received touch input on the touch screen display, setting an area related to the first detected location, based on at least one condition, detecting, if the touch input is released, a second location on the touch screen display from which the touch input is released, determining whether the second detected location is within the set area, and if it is determined that the second detected location is within the set area, determining whether at least one function is executed.

In accordance with another aspect of the present disclosure, there is provided a method of recognizing a touch input in an electronic device. The method includes receiving a touch input applied to a touch screen of the electronic device, setting, based on a first location touched on the touch screen, an area on the touch screen as a first size, decreasing the set area to a second size as a touch hold duration during which the touch input is maintained elapses, and recognizing the touch input as a cancel input if the touch input is released and if a second location from which the touch input is released is outside the set area.

BRIEF DESCRIPTION OF THE DRAWINGS

The above and other aspects, features and advantages of certain embodiments of the present invention will be more apparent from the following detailed description taken in conjunction with the accompanying drawings, in which:

FIG. 6 is a flowchart of a method of determining an object recognition area in an electronic device, according to an embodiment of the present disclosure;

FIG. 12 is a flowchart of a touch input recognition method of an electronic device, according to an embodiment of the present disclosure;

DETAILED DESCRIPTION

Figure 1:
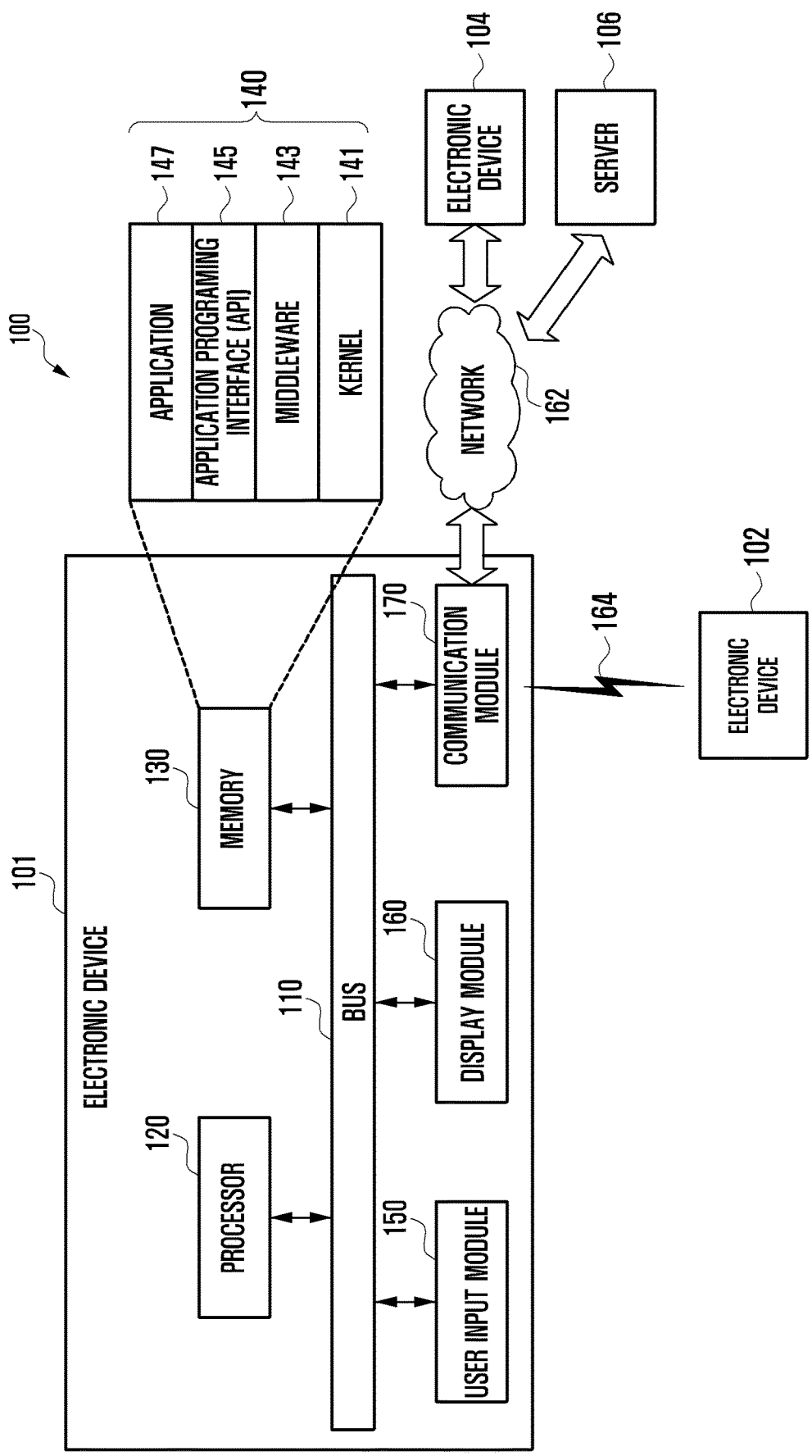
FIG. 1 is a diagram of an electronic device in a network environment, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present invention may include at least one of an Application-Specific Integrated Circuit (ASIC) chip, a Field-Programmable Gate Arrays (FPGA), and a programmable-logic device for performing operations which has been known or are to be developed hereinafter.

An electronic device according to the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of Things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the present disclosure, the term "user" may indicate a person using an electronic device or a device (e.g., an artificial intelligence electronic device) using an electronic device.

FIG. 1 is a diagram of a network environment 100 including an electronic device 101, according to an embodiment of the present disclosure. The electronic device 101 includes a bus 110, a processor 120, a memory 130, an input/output (I/O) interface 150, a display 160, and a communication interface 170.

The bus 110 may be a circuit connecting the above described components and transmitting communication (e.g., a control message) between the above described components. The processor 120 may receive commands from other components (e.g., the memory 130, the input/output interface 140, the display 150, the communication interface 160, or the communication control module) through the bus 110, analyze the received commands, and execute calculation or data processing according to the analyzed commands.

The memory 130 may store commands or data received from the processor 120 or other components (e.g., the input/output interface 140, the display 150, the communication interface 160, or the communication control module 170) or generated by the processor 120 or other components. The memory 130 may include programming modules, for example, a kernel 141, middleware 143, an Application Programming Interface (API) 145, or an application 147. Each of the aforementioned programming modules may be implemented by software, firmware, hardware, or a combination of two or more thereof.

The kernel 141 may control or manage system resources (e.g., the bus 110, processor 120, memory 130, etc.) used to execute operations or functions of the programming modules, e.g., the middleware 143, API 145, and application 147. The kernel 141 may also provide an interface that may access and control/manage the components of the electronic device 101 via the middleware 143, API 145, and the application 147.

The middleware 143 may make it possible for the API 145 or application 147 to perform data communication with the kernel 141. The middleware 143 may also perform control operations (e.g., scheduling, load balancing) for task requests transmitted from the application 147 by methods, e.g., a method for assigning the order of priority to use the system resources (e.g., the bus 110, processor 120, memory 130, etc.) of the electronic device 101 to at least one of the applications 147.

The API 145 is the interface for the applications 147 to control the function provided by the kernel 141 or the middleware 143 and may include at least one interface or function (e.g. command) for file control, window control, image control, or text control.

The I/O interface 150 may receive a command or data as input from a user via in-output apparatus (e.g., sensor, keyboard, or touchscreen, or the like) and may deliver the received command or data to the processor 120 or the memory 130 through the bus 110. The I/O interface 150 may display a video, an image, data, or the like to the user.

The display 160 may be a liquid crystal display (LCD) and an active matrix organic light emitting diode (AMOLED) display, microelectromechanical systems (MEMS), electronic paper display and the like. The display 160 may include the touch panel and one module. The display 160 may display the received various information (e.g., multimedia data, text data) from the above-described elements.

The communication interface 170 may connect communication between the electronic device 101 and an electronic device 104 or server 106. For example, the communication interface 170 may access a network 162 through wireless or wired communication to communicate with the external device. The wireless communication may include at least one of wireless-fidelity (WiFi), bluetooth (BT), near field communication (NFC), a global positioning system (GPS), and cellular communication (e.g., long-term evolution (LTE), LTE-advanced (LTE-A), code division multiple access (CDMA), wideband CDMA (WCDMA), universal mobile telecommunications system (UMTS), wireless broadband (WiBro) or global system for mobile communications (GSM)). The wired communication may include at least one of, for example, a universal serial bus (USB), a high definition multimedia interface (HDMI), recommended standard 232 (RS-232), and a plain old telephone service (POTS).

The wireless communication may include global navigation satellite system (GNSS). The GNSS may include at least one of, for example, a global positioning system (GPS), a global navigation satellite system (Glonass), a navigation satellite system (Beidou), and a European global satellite-based navigation system (Galileo), according to a use area, a bandwidth, or the like.

Figure 2:
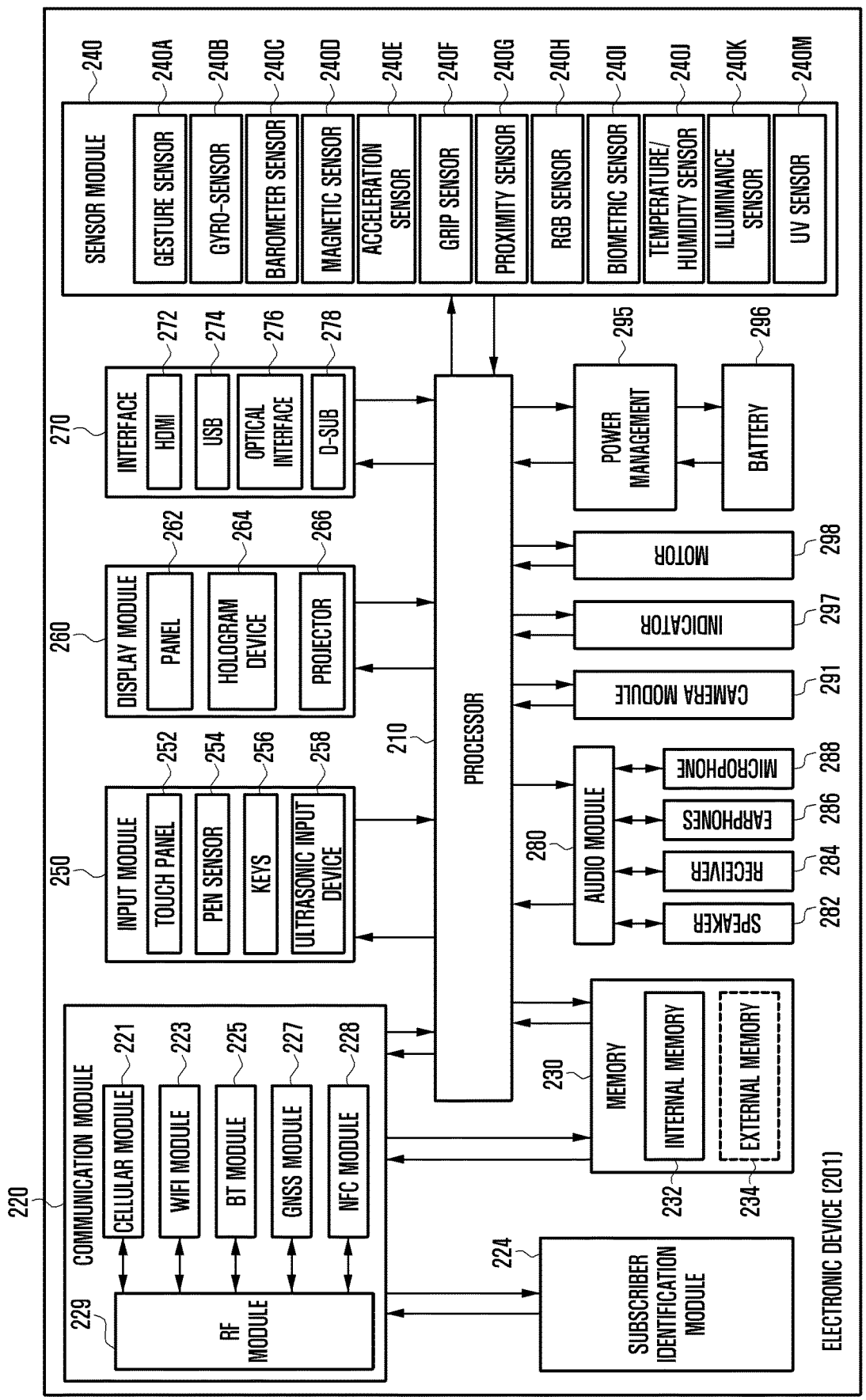
FIG. 2 is a block diagram of an electronic, according to an embodiment of the present disclosure.

FIG. 2 is a block diagram of an electronic device 201, according to an embodiment of the present disclosure. The electronic device 201 may include some or all of the parts of the electronic device 101 illustrated in FIG. 1. The electronic device 201 may include one or more application processors (APs) 210, a communication module 220, a subscriber identification module (SIM) 224, a memory 230, a sensor module 240, an input device 250, a display 260, an interface 270, an audio module 280, a camera module 291, a power managing module 295, a battery 296, an indicator 297, and a motor 298.

The AP 210 operates an operation system or an application program so as to control a plurality of hardware or software component elements connected to the AP 210 and execute various data processing and calculations including multimedia data. The AP 210 may be implemented by a System on Chip (SoC). The processor 210 may further include a graphic processing unit (GPU).

The communication module 220 may transmit/receive data in communication between different electronic devices (e.g., the electronic device 104 and the server 106 connected to the electronic device 201 through a network. The communication module 220 may include a cellular module 221, a WiFi module 223, a BT module 225, a GPS module 227, an NFC module 228, and a radio frequency (RF) module 229.

The cellular module 221 may provide a voice call, a video call, a short message service (SMS), or an internet service through a communication network (e.g., LTE, LTE-A, CDMA, WCDMA, UMTS, WiBro, GSM or the like). Further, the cellular module 221 may distinguish and authenticate electronic devices within a communication network by using the SIM 224. The cellular module 221 may perform at least some of the functions which can be provided by the AP 210 and may perform at least some of the multimedia control functions.

The cellular module 221 may include a communication processor (CP), and may be implemented by an SoC.

Although the components such as the cellular module 221 (e.g., a CP), the memory 230, and the power managing module 295 are illustrated as components separated from the AP 210 in FIG. 8, the AP 210 may include at least some (e.g., cellular module 221) of the aforementioned components in one embodiment.

The AP 210 or the cellular module 221 may load a command or data received from at least one of a non-volatile memory and other components connected to each of the AP 210 and the cellular module 221 to a volatile memory and process the loaded command or data. Further, the AP 210 or the cellular module 221 may store data received from at least one of other components or generated by at least one of other components in a non-volatile memory.

Each of the WiFi module 223, the BT module 225, the GPS module 227, and the NFC module 228 may include a process for processing data transmitted/received through the corresponding module. Although the cellular module 221, the WiFi module 223, the BT module 225, the GPS module 227, and the NFC module 228 are illustrated as blocks separated from each other in FIG. 2, at least some (e.g., two or more) of the cellular module 221, the WiFi module 223, the BT module 225, the GPS module 227, and the NFC module 228 may be included in one integrated chip (IC) or one IC package. For example, at least some (e.g., the CP corresponding to the cellular module 221 and the WiFi processor corresponding to the WiFi module 223) of the processors corresponding to the cellular module 225, the WiFi module 227, the BT module 228, the GPS module 221, and the NFC module 223 may be implemented by one SoC.

The RF module 229 may transmit/receive data, e.g., an RF signal. Although not illustrated, the RF module 229 may include a transceiver, a power amplifier module (PAM), a frequency filter, a low noise amplifier (LNA) or the like. Further, the RF module 229 may further include a component for transmitting/receiving electronic waves over a free air space in wireless communication, e.g., a conductor, a conducting wire or the like. Although the cellular module 221, the WiFi module 223, the BT module 225, the GPS module 227, and the NFC module 228 share one RF module 229 in FIG. 2, at least one of the cellular module 221, the WiFi module 223, the BT module 225, the GPS module 227, and the NFC module 228 may transmit/receive an RF signal through a separate RF module.

The SIM 224 may be inserted into a slot formed in a particular portion of the electronic device 201. The SIM 224 may include unique identification information (e.g., integrated circuit card identifier (ICCID)) or subscriber information (e.g., international mobile subscriber identity (IMSI).

The memory 230 may include an internal memory 232 or an external memory 234. The internal memory 232 may include at least one of a volatile memory (e.g., a dynamic random access memory (DRAM), a static RAM (SRAM), a synchronous dynamic RAM (SDRAM), and the like), and a non-volatile Memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, an NOR flash memory, and the like).

The internal memory 232 may be a solid state drive (SSD). The external memory 234 may further include a flash drive, for example, a compact flash (CF), a secure digital (SD), a micro secure digital (Micro-SD), a mini secure digital (Mini-SD), an extreme digital (xD), or a memory stick. The external memory 234 may be functionally connected to the electronic device 201 through various interfaces. The electronic device 201 may further include a storage device (or storage medium) such as a hard drive.

The sensor module 240 may measure a physical quantity or detect an operation state of the electronic device 201, and convert the measured or detected information to an electronic signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, and blue (RGB) sensor) 240H, a biometric sensor 240I, a temperature/humidity sensor 240J, an illumination sensor 240K, and an ultra violet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, a fingerprint sensor, and the like. The sensor module 240 may further include a control circuit for controlling one or more sensors included in the sensor module 240.

The input device 250 may include a touch panel 252, a (digital) pen sensor 254, a key 256, or an ultrasonic input device 258. The touch panel 252 may recognize a touch input in at least one type of a capacitive type, a resistive type, an infrared type, and an acoustic wave type. The touch panel 252 may further include a control circuit. In the capacitive type, the touch panel 252 can recognize proximity as well as a direct touch. The touch panel 252 may further include a tactile layer. In this event, the touch panel 252 may provide a tactile reaction to the user.

The (digital) pen sensor 254 may be implemented using a method identical or similar to a method of receiving a touch input of the user, or using a separate recognition sheet. The key 256 may include a physical button, an optical key, or a key pad. The ultrasonic input device 258 is a device which can detect an acoustic wave by a microphone 288 of the electronic device 201 through an input means generating an ultrasonic signal to identify data and can perform wireless recognition. The electronic device 201 may receive a user input from an external device (e.g., computer or server) connected to the electronic device 201 by using the communication module 220.

The display 260 may include a panel 262, a hologram device 264, or a projector 266. The panel 262 may be an LCD or an AM-OLED. The panel 262 may be flexible, transparent, or wearable. The panel 262 may be configured by the touch panel 252 and one other module. The hologram device 264 may show a stereoscopic image in the air by using interference of light. The projector 266 may project light on a screen to display an image. The screen may be located inside or outside the electronic device 201. The display 260 may further include a control circuit for controlling the panel 262, the hologram device 264, or the projector 266. The interface 270 may include an HDMI 272, a USB 274, an optical interface 276, or a d-subminiature (D-sub) 278. The interface 270 may be included in the communication interface 160 illustrated in FIG. 1. Additionally or alternatively, the interface 290 may include a mobile high-definition link (MHL) interface, a secure digital (SD) card/multi-media card (MMC), or an IR data association (IrDA) standard interface.

The audio module 280 may bi-directionally convert a sound and an electronic signal. At least some components of the audio module 280 may be included in the input/output interface 140 illustrated in FIG. 1. The audio module 280 may process sound information input or output through, for example, a speaker 282, a receiver 284, an earphone 286, the microphone 288 or the like.

The camera module 291 is a device which can photograph a still image and a video. The camera module 291 may include one or more image sensors (e.g., a front sensor or a back sensor), an image signal processor (ISP) or a flash (e.g., an LED or xenon lamp).

The power managing module 295 may manage power of the electronic device 201. Although not illustrated, the power managing module 295 may include a power management integrated circuit (PMIC), a charger integrated circuit (IC), or a battery gauge.

The PMIC may be mounted to an integrated circuit or an SoC. A charging method may include wired and wireless methods. The charger IC may charge a battery and prevent over voltage or over current from being flowed from a charger. The charger IC may include a charger IC for at least one of the wired charging method and the wireless charging method. The wireless charging method may include a magnetic resonance method, a magnetic induction method and an electromagnetic wave method, and additional circuits for wireless charging, e.g., circuits such as a coil loop, a resonant circuit, a rectifier or the like may be added.

The battery gauge may measure a remaining quantity of the battery 296, or a voltage, a current, or a temperature during the charging. The battery 296 may store or generate electricity and supply power to the electronic device 201 by using the stored or generated electricity. The battery 296 may include a rechargeable battery or a solar battery.

The indicator 297 may show particular statuses of the electronic device 201 or a part (e.g., AP 210) of the hardware, e.g., a booting status, a message status, a charging status and the like. The motor 298 may convert an electrical signal to a mechanical vibration.

Although not illustrated, the electronic device 201 may include a processing unit (e.g., GPU) for supporting a module TV. The processing unit for supporting the mobile TV may process media data according to a standard of digital multimedia broadcasting (DMB), digital video broadcasting (DVB), media flow or the like.

Each of the components of the electronic device 201 may be implemented by one or more components and the name of the corresponding component may vary depending on a type of the electronic device. The electronic device 201 may include at least one of the above described components, a few of the components may be omitted, or an additional component may be further included. Also, some of the components of the electronic device 201 may be combined to form a single entity, and thus may equivalently execute functions of the corresponding components before being combined.

Figure 3:
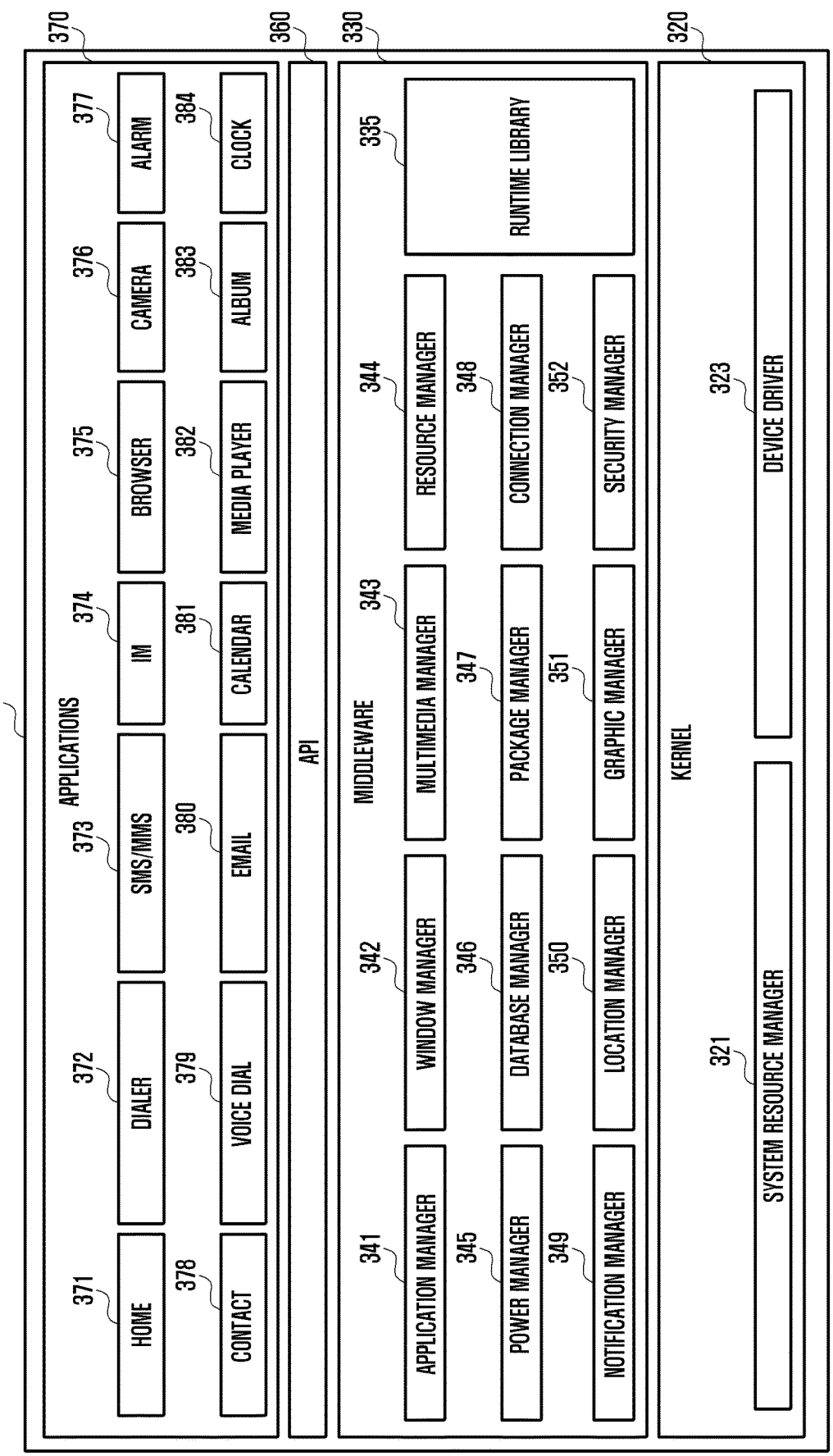
FIG. 3 is a block diagram of a program module, according to an embodiment of the present disclosure.

FIG. 3 is a block diagram of a programming module 310, according to an embodiment of the present disclosure. The programming module 310 may be included (stored) in the electronic device 101 (e.g., memory 130) illustrated in FIG. 1. At least some of the programming module 310 may be formed of software, firmware, hardware, or a combination of at least two of software, firmware, and hardware. The programming module 310 may be executed in the hardware (e.g., electronic device 201) to include an operating system (OS) controlling resources related to the electronic device 101 or various applications driving on the OS. For example, the OS may be Android™, iOS™, Windows™, Symbian™, Tizen™, Bada™ or the like. Referring to FIG. 3, the programming module 310 may include a kernel 320, a middleware 330, an API 360, or an application 370.

The kernel 320 may include a system resource manager 321 or a device driver 323. The system resource manager 321 may include a process manager, a memory manager, or a file system manager. The system resource manager may perform a system resource control, allocation, or recall. The device driver 323 may include a display driver, a camera driver, a BT driver, a shared memory driver, a USB driver, a keypad driver, a WiFi driver, or an audio driver. Further, the device driver 323 may include an inter-process communication (IPC) driver.

The middleware 330 may include a plurality of modules to provide a function required in common by the applications 370. Further, the middleware 330 may provide a function through the API 360 to allow the application 370 to efficiently use limited system resources within the electronic device. For example, as illustrated in FIG. 3, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module used by a complier to add a new function through a programming language while the application 370 is executed. The runtime library 335 may execute input and output, management of a memory, a function associated with an arithmetic function or the like.

The application manager 341 may manage a life cycle of at least one of the applications 370. The window manager 342 may manage GUI resources used on the screen. The multimedia manager 343 may detect a format required for reproducing various media files and perform an encoding or a decoding of a media file by using a codec suitable for the corresponding format. The resource manager 344 may manage resources such as a source code, a memory, or a storage space of at least one of the applications 370.

The power manager 345 may operate together with a basic input/output system (BIOS) to manage a battery or power and provide power information required for the operation. The database manager 346 may manage generation, search, or change of a database to be used by at least one of the applications 370. The package manager 347 may manage an installation or an update of an application distributed in a form of a package file.

The connectivity manager 348 may manage a wireless connection such as WiFi or BT. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface related to the graphic effect. The security manager 352 may provide a general security function required for a system security or a user authentication. When the electronic device 100 has a call function, the middleware 330 may further include a telephony manager for managing a voice of the electronic device or a video call function.

The middleware 330 may generate a new middleware module through a combination of various functions of the aforementioned internal component modules and use the generated new middleware module. The middleware 330 may provide a module specified for each type of operating system to provide a differentiated function. Further, the middleware 330 may dynamically delete some of the conventional components or add new components. Accordingly, some of the components may be omitted, replaced with other components having different names but performing similar functions, or other components may be further included.

The API 360 is a set of API programming functions, and may be provided with a different configuration according to an OS. For example, in Android™ or iOS™, a single API set may be provided for each platform. In Tizen™, two or more API sets may be provided.

The applications 370 may include a preloaded application or a third party application.

At least some of the programming module 310 may be implemented by a command stored in a computer-readable storage medium. When the command is executed by one or more processors 210, the one or more processors may perform a function corresponding to the command. The computer-readable storage medium may be, for example, the memory 260. At least some of the programming module 310 may be implemented or executed by, for example, the processor 210. At least some of the programming module 310 may include, for example, a module, a program, a routine, sets of instructions, or a process for performing one or more functions.

Names of components of the programming module 310 may vary depending on a type of operating system. Further, the programming module may include one or more of the aforementioned components, omit some of the components, or further include other additional components.

The applications 370 may include one or more applications that can perform functions, such as home application 371, dialer application 372, SMS/MMS application 373, instant message application (IM) 374, browser application 375, camera application 376, alarm application 377, contacts application 378, voice dial application 379, e-mail application 380, calendar application 381, media player application 382, album application 383, clock application 384, health care (e.g., measure exercise quantity or blood sugar level), or environment information (e.g., atmospheric pressure, humidity, temperature information or the like).

Figure 4:
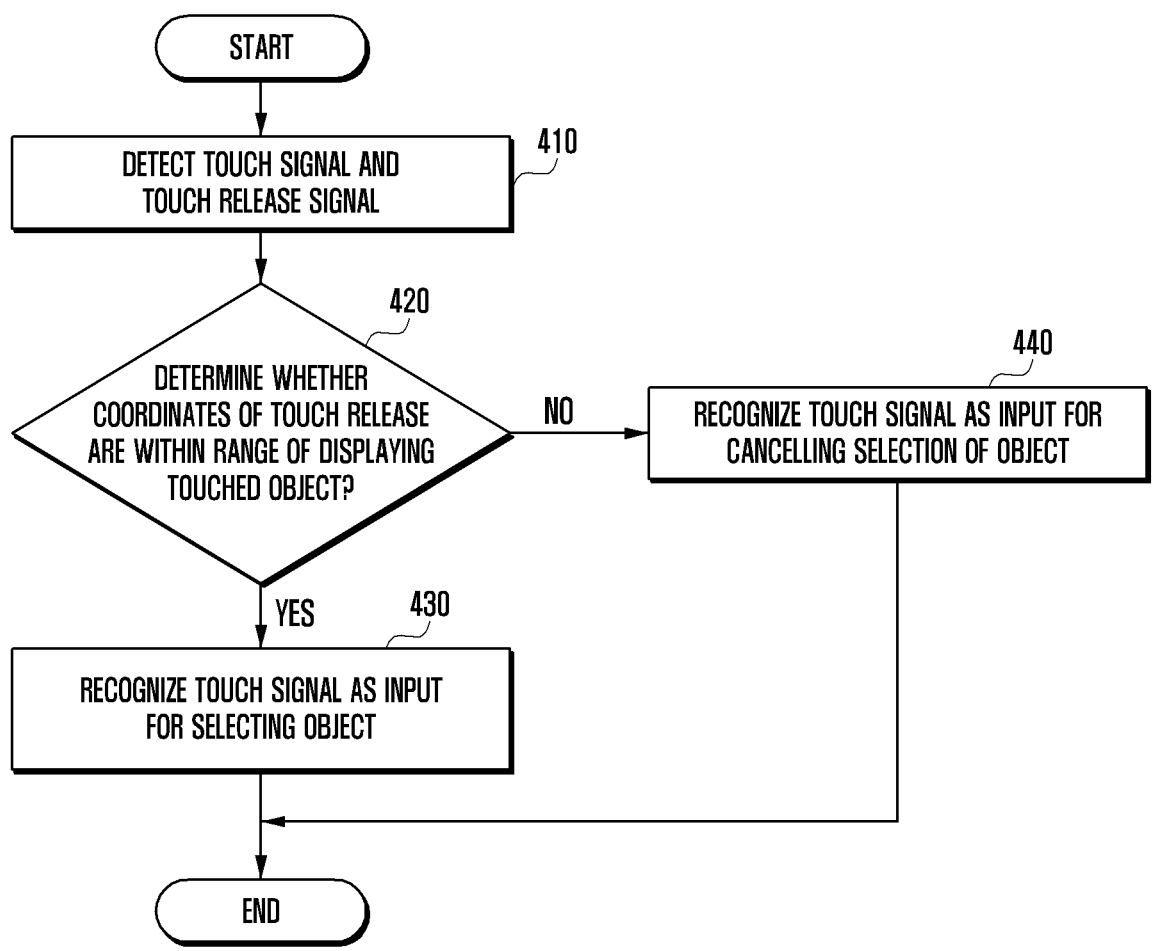
FIG. 4 is a flowchart of a touch input recognition method of an electronic device, according to an embodiment of the present disclosure.

FIG. 4 is a flowchart of a touch input recognition method of an electronic device, according to an embodiment of the present disclosure.

An electronic device (e.g., electronic devices 101/201) with a touch screen can recognize a touch input selecting an object (e.g., icon, button, etc.) displayed on the display 160, activate the selected object, and execute a function corresponding to the activated object.

For example, the electronic device can detect a touch signal and a touch release signal in response to a user's touch applied to the touch screen (e.g., the touch panel 252) in step 410. The electronic device can control the display to display a GUI screen including at least one object (e.g., icon, app, execution key, list item, etc.). The user may apply a touch and touch release (or a tap) to the display in order to select an object displayed on the GUI screen.

In order to identify a touch input selecting the object, the electronic device can determine whether coordinates of the touch release are within a range of displaying the touched object in step 420. The electronic device can detect a range of displaying an object via coordinates of an area displaying the object on the touch screen.

If the electronic device ascertains that coordinates of the touch release are within a range of displaying the touched object in step 420, the electronic device can recognize the touch signal as an input for selecting an object in step 430. The electronic device can also execute a function (e.g., object activation, etc.) related to the selected object in response to the selection input.

On the other hand, if the electronic device ascertains that coordinates of the touch release are out of a range of displaying the touched object in step 420, the electronic device can recognize the touch signal as an input for cancelling the selection of the object in step 440.

However, the touch recognition method described above may generate an error in coordinates of a touch release according to by a user's intent because of various causes, such as a relatively small size of object, movement of an electronic device or a user, a distortion of a touch screen when it is implemented, etc., or may recognize a touch as a cancel input by, regardless of a user's intent, detecting that coordinates of a touch release are out of a range of displaying an object.

In order to resolve the above problems, the present disclosure provides methods of recognizing touches, considering a touch recognition range based on touch time.

Figure 5:
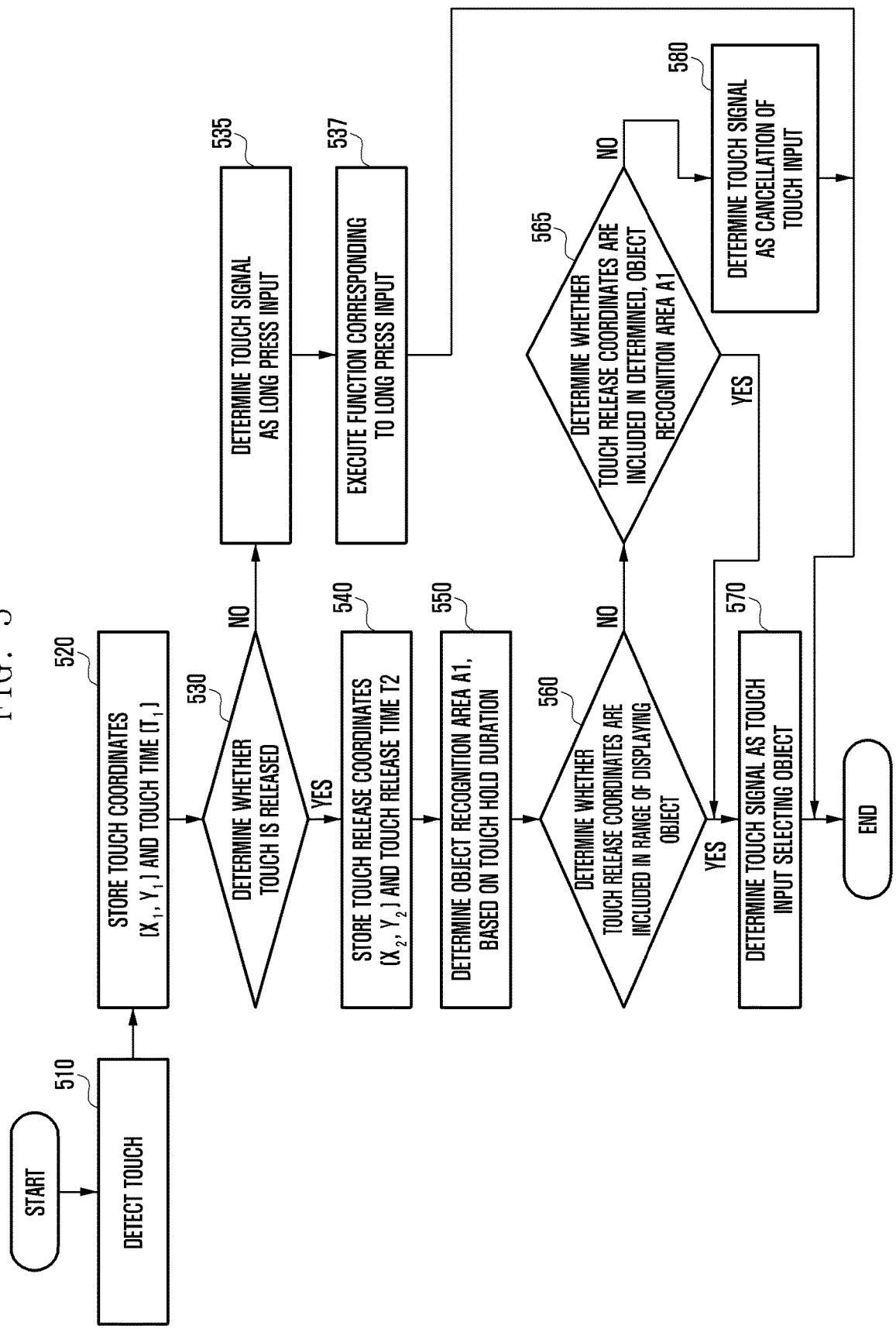
FIG. 5 is a flowchart of a touch input recognition method of an electronic device, according to an embodiment of the present disclosure.

FIG. 5 is a flowchart of a touch input recognition method of an electronic device, according to an embodiment of the present disclosure.

A processor (e.g., the processor 120 of FIG. 1 or the processor 210 of FIG. 2) of an electronic device (e.g., the electronic device 101) can detect (or receive) a touch input in step 510. The electronic device can control the touch screen (or display panel) and providing a user with an interactive GUI screen that the user interacts with. The GUI screen may include a home screen, app execution screen, text composition screen, key pad screen, web browser screen, etc., but is not limited thereto. The processor can identify at least one of a location to which a touch is initially touched (the initially touched location), the movement of a touch, and a location from which a touch is released, via touch coordinates included in a touch signal transferred from the touch screen.

For example, the touch screen can generate an analog signal (e.g., touch signal) in response to a touch by a touch tool (e.g., a user's finger or a pen), converting the analog signal into a digital signal, and transferring the digital signal to the processor of the electronic device. The touch signal may include information regarding at least one of the touch coordinates (X, Y) of any touch. If the processor detects the initial touch signal from the touch screen, the processor can identify the touch coordinates and determining whether the object is selected. If an object is selected by a touch, the processor can display information notifying that an object has been selected on the display. For example, if an object is selected by a touch, the processor can control the display to show the object in a floating state.

The processor can store the initial touch coordinates (X1, Y1) of a location at which a touch signal is initially generated and the initial touch time T1 in response to the touch signal in step 520.

If the initial touch signal includes at least one of the touch coordinates of any touch, the processor can select a center point of touch, based on the capacitance magnitude and the pressure magnitude of a touch, and store coordinates of the initial touch as a center point of a touch. For example, if the processor recognizes a first touch as touch coordinates within an object and a second touch as touch coordinates outside an object, from among the touch signals which are being received, the processor can set the first touched location as the initial touch coordinates. Alternatively, if the processor detects a first touch and a second touch within an area of displaying an object (an object display area), the processor can set a touch location close to the center of the object display area as the initial touch coordinates.

The processor can store the initial touch time as zero "0," and counting the touch hold duration while a touch is held. Alternatively, the processor can store a current time of an electronic device at a timing when the touch signal is received as the initial touch time.

The processor can determine whether a touch release is detected based on a condition as whether a touch signal is received in step 530. If the processor does not receive a touch signal from the touch screen, it may ascertain that the touch is released.

If a touch release is not generated and a touch is held during a period of time (the duration) set corresponding to a long press input, the processor determines that the touch signal is a long press input in step 535. The processor can execute a function corresponding to the long press input in step 537. If coordinates of a touch are changed, the processor ascertains that the touch is moved, and calculates the variation of location and the moving speed of the touch, etc., in response to the movement of the touch. The processor can distinguish user inputs (gestures) from each other, based on touch coordinates, a condition as to whether a touch is released, a condition as to whether a touch is moved, the location variation of a touch, the moving speed of a touch, etc.

If the processor ascertains that the touch is released, the processor can identify touch coordinates of a touch signal which was last received, and store the last touch release coordinates (X2, Y2) and the touch release time T2 in step 540.

The processor can also measure and ascertain the touch hold duration, based on the initial touch time T1 and the touch release time T2.

For example, after storing the initial touch time as "0," the processor can count the initial touch time while a touch is held, i.e., a touch signal is successively received. The processor ascertains a counted time at a timing when a touch signal is not received, and measuring the touch hold duration.

Alternatively, the processor may measure the touch hold duration by calculating a difference between a current time of the electronic device at a timing when a touch is initially applied (the initial touch timing) and a current time of the electronic device at a timing when the touch is last released (the last touch release timing).

The processor can determine an object recognition area A1, based on the touch hold duration in step 550.

The processor can determine the initial object recognition area A as a preset reference size, based on the initial touch coordinates as a center point. An object recognition area may be set in various forms, based on at least one of a type of app being executed on the screen, a form of object displayed on the screen, a movement state of the electronic device, a type of electronic device, and a size of display panel. An object recognition area may be at least one of the following shapes based on the initial touch coordinates, quadrangle, circle, rectangle, regular quadrilateral, and ellipse; but the shapes are not limited thereto.

The processor can set the initial object recognition area A to have a reference size, based on the initial touch coordinates as a center point, and adjust the initial object recognition area to be decreased in size from the reference size in proportion to the touch hold duration. The reference size of the object recognition area may vary, depending on the form and size of an object related to the touched location.

The decrease rate of the object recognition area may vary depending on the settings, and may be set differently, according to a type of app, a form of object, or a movement state of the electronic device.

The initial object recognition area may be set to have a size greater than a range of displaying an object, and may decrease to a size less than a range of displaying an object as the touch hold duration has elapsed.

For example, in a state where the processor sets the initial object recognition area A based on the initial touch coordinates as a center point, if the touch hold duration, e.g., 0.5 sec, has elapsed, the processor can ascertain the object recognition area A1 decreased from the initial object recognition area A, in response to the 0.5 sec. If the touch hold duration, e.g., 1.5 sec, has elapsed, the processor can ascertain an object recognition area A1 decreased from the initial object recognition area A, in response to the 1.5 sec. In this case, the initial object recognition area, decreased in response to the 1.5 sec, is less in size than the object recognition area decreased in response to 1 sec.

It may prove advantageous that the processor controls the display not to display the object recognition area on the display panel; however, the processor may control the display to display the object recognition area on the display panel, based on the touched location, in order to notify the user of the touched object. For example, the processor may control the display to display an indicator indicating a location of touch coordinates, information or an indicator indicating an object recognition area, etc., on the screen.

The processor can determine whether the touch release coordinates are included in a display range of object in step 560. For example, the processor can ascertain screen information displayed on the display panel, and detect a location of the object displayed on the screen and a display range of object.

If the processor ascertains that the touch release coordinates are included in a range of displaying an object in step 560, the processor can determine (or recognize) the touch signal as a touch input selecting an object in step 570. The processor can execute a function corresponding to the input selecting an object, in response to the touch release, and control the display to display the executed function. If the processor ascertains that the touch release coordinates are out of a range of displaying an object in step 560, the processor can determine whether the touch release coordinates are included in the determined, object recognition area A1 in step 565. If the processor ascertains that the touch release coordinates are out of a range of displaying an object but included in the object recognition area A1, the processor proceeds with step 570 and determines the touch signal as a touch input selecting an object.

If the processor ascertains that the touch release coordinates are out of a range of displaying an object and also the determined, object recognition area A1 in step 565, the processor can determine the touch signal as the cancellation of a touch input in step 580.

If the processor recognizes that the touch signal is the cancellation of a touch input, the processor may not display information indicating that an icon has been selected on the display. For example, while the processor controls, if an object is selected by a touch, the object to be shown in a floating state and if the processor ascertains that the touch input is cancelled, the processor may return the display of the object to a default display state.

FIG. 6 is a flowchart of a method of determining an object recognition area in an electronic, according to an embodiment of the present disclosure.

A processor of the electronic device can detect (or receive) a touch input in step 610. The processor can determine that an object displayed on a touch screen is selected, via touch coordinates included in a touch signal transferred from the touch screen.

If the processor determines that an object has been selected, the processor may display information indicating that an object has been selected on the display. For example, the processor may control the object to be shown in highlight form or in a floating state.

The processor can store the initial touch coordinates (X1, Y1) of a location at which a touch signal is initially generated and the initial touch time T1 in response to the touch signal in step 620.

The processor can determine an object recognition area A as a first size to have a reference size, based on the touch coordinates (X1, Y1) as a center point in step 630. The object recognition area A can be an area created based on the touch timing, separate from a touch range for the selection of an object. Information indicating an object recognition area may be displayed on the display; however, it may prove advantageous that the information is not displayed.

While the touch signal is received, the processor adjusts the size of the determined, object recognition area A1, based on the touch hold duration in step 640. For example, the processor can adjust the object recognition area to decrease gradually in size from a first size to a second size as the touch hold duration increases. The processor can also adjust the object recognition area to decreases (e.g., from the size of A to the size of A1) and share the touch coordinates as a center point. For example, the processor can create data from the decrease rate and information regarding the object recognition area, and temporarily store the data. Although the touch coordinates included in the touch signal are changed, the processor can control the first object recognition area, determined based on the initial touch point, to decrease in size.

The processor can count time from a timing when the touch signal is received. The processor can adjust the first object recognition area A to decrease the size by a certain magnitude each time when a time is counted or every certain time interval (e.g., 100 ms) to a size of a second object recognition area A1.

If a touch signal is not received, the processor can detect that touch is released, identifying touch coordinates of a touch signal which is last received, and store the last touch release coordinates (X2, Y2) in step 650.

The processor can determine whether the touch release coordinates are included in a range of displaying an object in step 660. For example, the processor can ascertain screen information displayed on the display panel, and detect a location of the object displayed on the screen and a range of displaying an object.

If the processor ascertains that the touch release coordinates are included in a range of displaying an object in step 660, the processor can determine (or recognize) the touch signal as a touch input selecting an object in step 670. The processor can execute a function corresponding to the input selecting an object, in response to the touch release, and control the display to display the executed function.

If the processor ascertains that the touch release coordinates are out of a range of displaying an object in step 660, the processor can determine whether the touch release coordinates are included in the adjusted, object recognition area A1 in step 665. If the processor ascertains that the touch release coordinates are out of a range of displaying an object but included in the object recognition area A1, the processor can proceed with step 670 and determine the touch signal as a touch input selecting an object in step 670.

If the processor ascertains that the touch release coordinates are out of a range of displaying an object and also the adjusted, object recognition area A1 in step 665, the processor can determine the touch signal as the cancellation of a touch input in step 680. If the processor recognizes that the touch signal is the cancellation of a touch input, the processor may not display information indicating that an icon has been selected on the display. For example, while the processor controls, if an object is selected by a touch, the object to be shown in a floating state, if the processor ascertains that the touch input is cancelled, the processor may return the display of the object to a default state.

The electronic device can support the touch input recognition method described above. Hereinafter, an object recognition area according to user interaction is explained with reference to diagrams of a screen.

Hereinafter, the drawings are explained based on the screen on which an indicator indicating a location of touch coordinates and an indicator indicating an object recognition area are displayed. It should be understood by those skilled in the art that the indicators are only visually displayed to describe the embodiments. Therefore, the indicators showing an object recognition area or the form are not displayed on the display panel of the electronic device. However, it should be understood that indicators indicating an object recognition area may be displayed on the screen according to the settings.

Figure 7A:
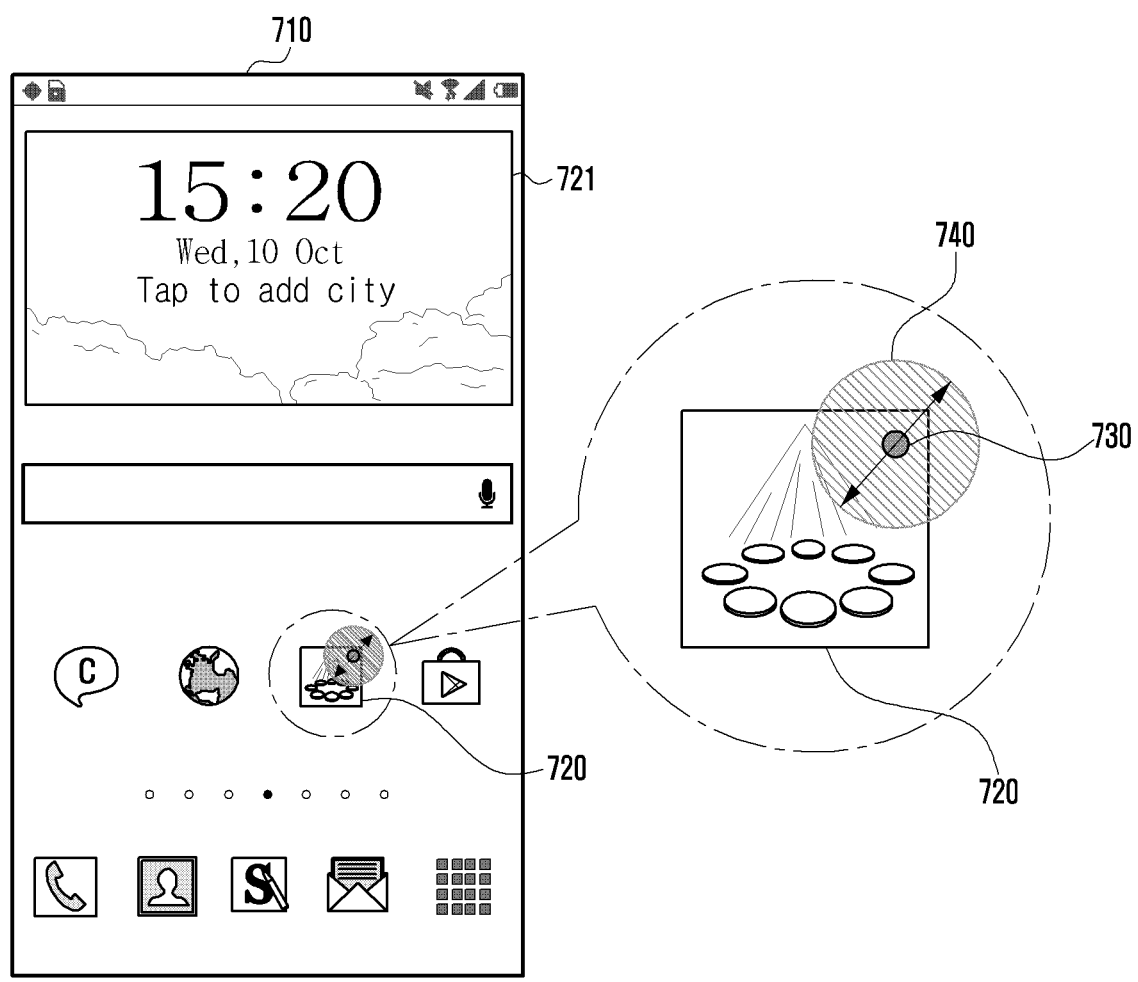
FIGS. 7A and 7B are diagrams illustrating a touch recognition operation, according to an embodiment of the present disclosure.
Figure 7B:
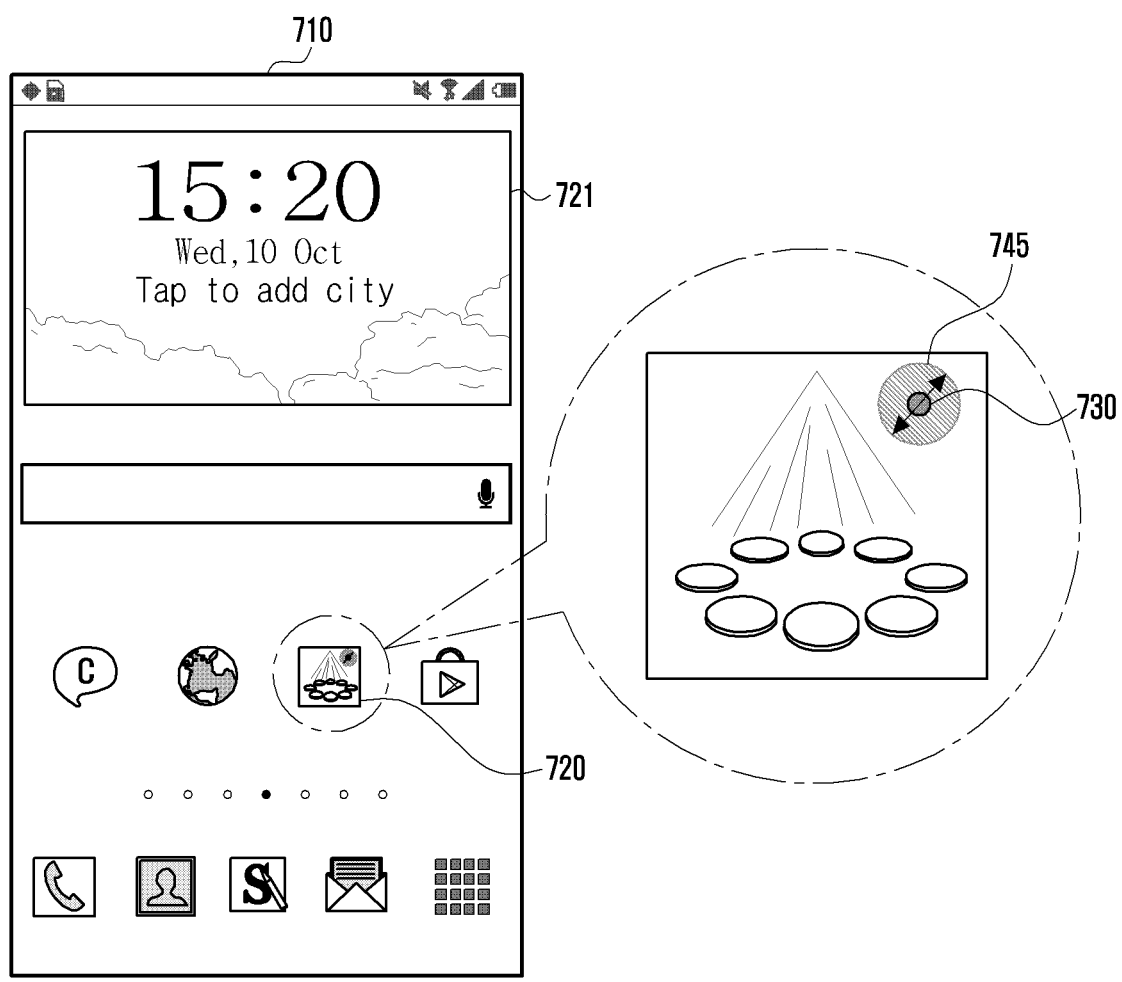

FIGS. 7A and 7B are diagrams illustrating the touch recognition operation, according to an embodiment of the present disclosure.

The processor of an electronic device can control the display to display a first screen 710 including at least one object. At least one object may be an app icon, but is not limited thereto. The first screen 710 may be a home screen, and may include at least one app execution icon 720 and a widget item 721.

The user can apply a touch and touch release (or a tap) to a location on the first screen, at which an object is displayed in order to select the object. The processor can receive a touch signal generated in response to a user's touch from the touch screen. The touch signal may be generated as a touch tool (e.g., a user's finger or a touch pen) contacts or hovers over the touch panel, and may include information regarding touch coordinates.

The processor can identify a location of the initial touch coordinates 730 in response to the received touch signal, and determine an initial object recognition area 740, based on the initial touch coordinates 730. In a state where the user zooms in the touch area, if the user touches an icon to execute an app, the processor identifies the initial touch coordinates 730 corresponding to the touched location. The processor can generate a first object recognition area 740 having a first radius, based on the initial touch coordinates 730.

If the processor no longer receives a touch signal from the touch screen while continuously receiving the touch signal, the processor ascertains that a touch is released and identifies touch release coordinates 735 (as shown in FIG. 7B) or last touch coordinates of a touch signal which is last received. For example, the touch release coordinates 735 may be touch coordinates that correspond to one of the touch signals which are received from the touch screen and are last stored. The processor may ascertain that the initial touch coordinates 730 and touch release coordinates 735 correspond to the same location. Alternatively, the processor may ascertain that the initial touch coordinates 730 and touch release coordinates 735 correspond to different locations by the movement of the electronic device, etc.

The processor can ascertain a touch hold duration during which a touch signal has been continuously received, and determine a second object recognition area 745 which is decreased in size as the touch hold duration has elapsed as shown in FIG. 7B. The processor can decrease the initially created, first object recognition area 740 to the second object recognition area 745, based on time T1, stored at a timing when an input is applied at the initial touch coordinates 730, and time T2, stored at a timing when an input is released at the last touch release coordinates 735. The second object recognition area 745 is decreased in size and smaller than the first object recognition area shown in FIG. 7A. The second object recognition area 745 is decreased to have a size smaller than the first object recognition area 740 set based on the initial touch coordinates 730 as a center point, and has the same center point as the first object recognition area 745.

If the touch release coordinates 735 exist within a display area of an app icon 720 or within the second object recognition area 745, the processor determines the touch as an input selecting a selected icon and executing an app corresponding to the icon.

On the other hand, if the touch release coordinates 735 are out of the display area of the selected object 720 or the second object recognition area 745, the processor may determine that the touch is the cancellation of a touch input selecting the app and may not execute a function corresponding to the touch input.

Figure 8A:
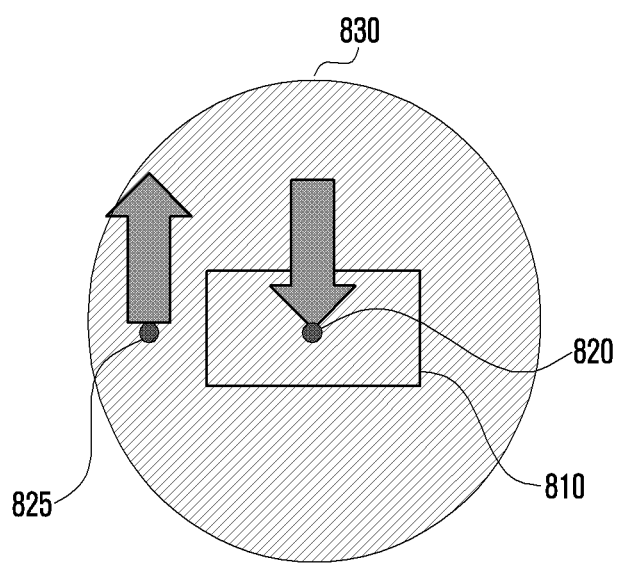
FIGS. 8A and 8B are diagrams illustrating the touch recognition operation, according to an embodiment of the present disclosure.
Figure 8B:
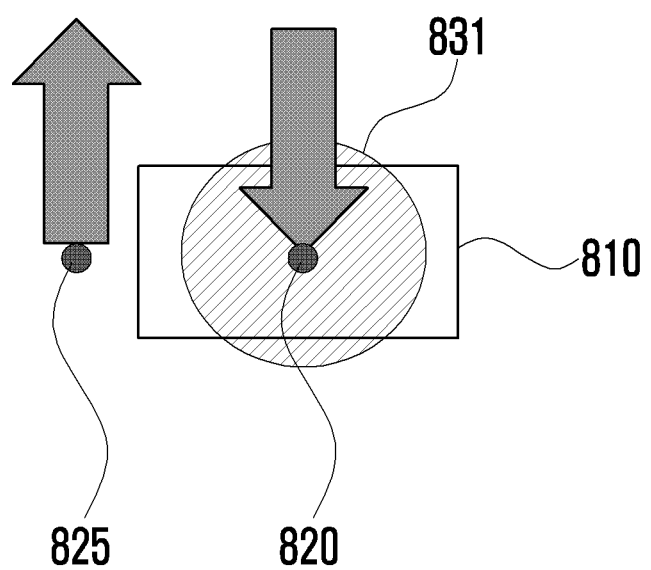

FIGS. 8A and 8B are diagrams illustrating the touch recognition operation, according to an embodiment of the present disclosure.

The electronic device can control the object recognition area to vary in response to the touch hold duration. In this case, although touch release coordinates are out of the display range of object, the electronic device can recognize that a touch input selects an object or that a touch input is cancelled.

The processor of the electronic device can display at least one object, e.g., a function execution key 810, on the touch screen. The execution key 810 may be one button key displayed on the screen. The user can apply a touch and touch release to a button in order to select the button. The processor recognizes touch coordinates 820 at a first location and touch release coordinates 825 at a second location.

The processor may recognize that touch coordinates and touch release coordinates differ from each other for a location, because of the movement of an electronic device and the difficulty in implementing a touch screen, against a user's intent. In this case, a touch time and a touch release time, i.e., the touch hold duration, are short, and the object recognition area 830 may be set to have a display range greater than a range of displaying the function execution key 810 as shown in FIG. 8A.

Since a second location 825 from which a touch is released is out of a display range of a button key or within the set, object recognition area 830 as shown in FIG. 8A, the processor can determine the input as an input selecting a button key in response to the touch release and executing a function corresponding to the determination.

On the other hand, FIG. 8B shows an example when an object recognition area is decreased in response to the touch hold duration. In another example, the processor can also control an object recognition area, set at a touch timing, to decrease in response to the touch hold duration during which a touch is maintained. The object recognition area 831 shown in FIG. 8B may correspond to an area set if the touch hold duration is greater than that of FIG. 8A.

While a user's touch is maintained, the processor sets the size of the object recognition area 830, set at a touch timing, to be decreased. During the touch hold duration, the processor decreases the size of the object recognition area and sets an area corresponding to a touch release timing to the size of the object recognition area 831.

The processor can recognize touch coordinates 820 at a first location and touch release coordinates 825 at a second location. Since the touch release coordinates 825 of the second location is out of a display range of the function execution key 810 and also a range of object recognition area 831 set based on the first location as a center point, the processor can determine that a touch input is cancelled. Since the processor determines that a touch input is cancelled, the processor may not execute a function in response to a touch and touch release.

Figure 9:
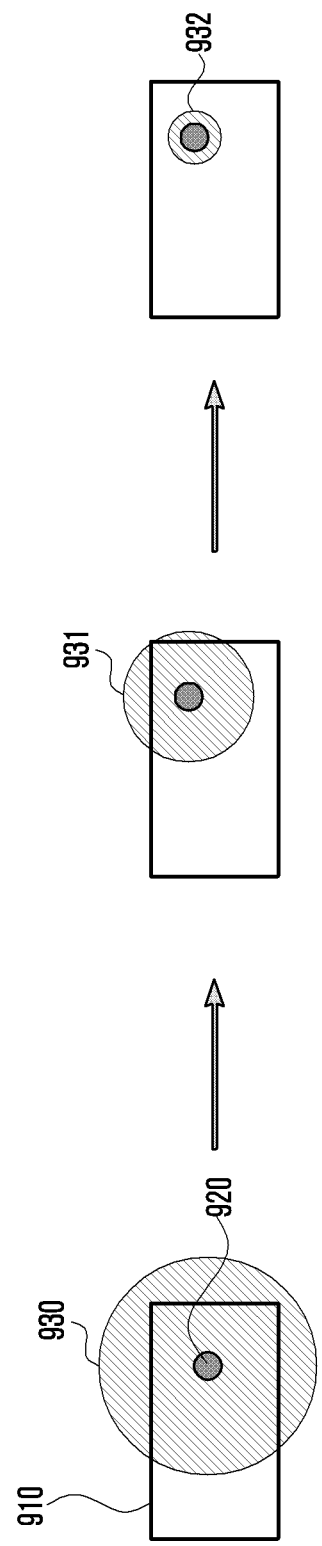
FIG. 9 are diagrams illustrating the touch recognition operation, according to an embodiment of the present disclosure.
Figure 10A:
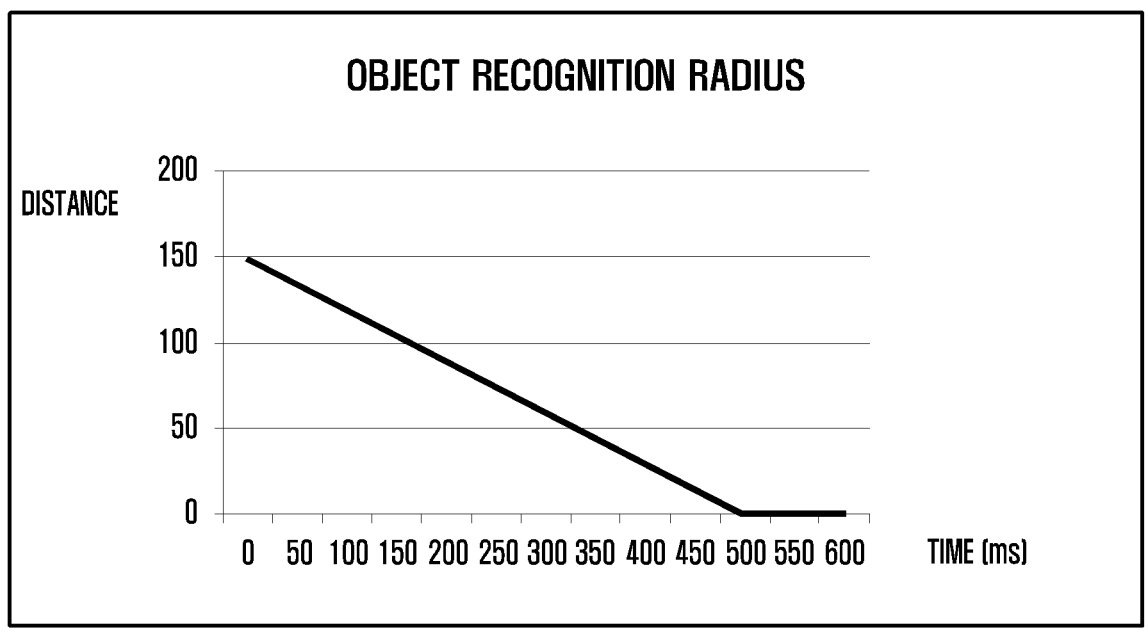
FIGS. 10A and 10B are graphs showing an alteration of an object recognition area, according to an embodiment of the present disclosure.
Figure 10B:
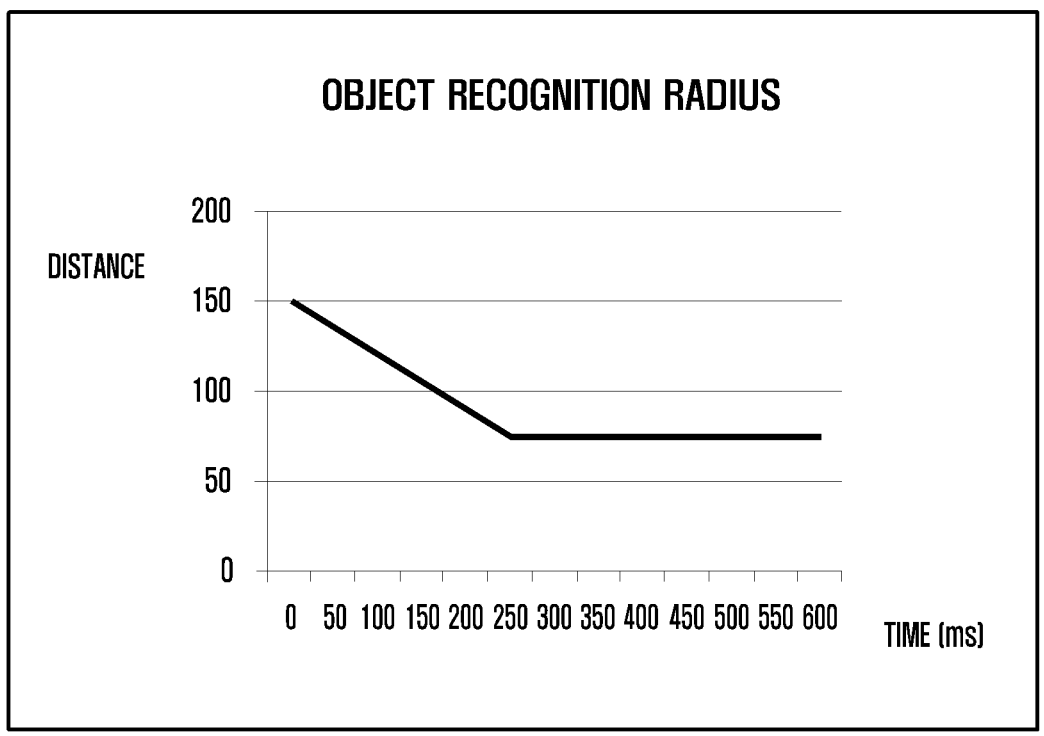

FIG. 9 are diagrams illustrating the touch recognition operation, according to an embodiment of the present disclosure. FIGS. 10A and 10B are graphs showing the alteration of an object recognition area, according to an embodiment of the present disclosure.

With reference to FIG. 9, the electronic device can generate an object recognition area using various methods and adjusting the generated object recognition area.

For example, the electronic device may be set so that the object recognition area is decreased in size by a certain size every a certain interval of time. With reference to diagram 910, if a timing when initial touch coordinates 920 are stored is, e.g., 0 ms after a touch, the processor receives a touch signal selecting the object 910 and sets the first object recognition area 920 as a first size, based on the initial touch coordinates 920 as a center point.

If a touch is applied after a first time, e.g., 250 ms after a touch, has elapsed, the processor can set the first object recognition area 930 to be decreased to the size of a second object recognition area 931, based on the initial touch coordinates as a center point.

If a touch is applied after a second time, e.g., 450 ms after a touch, has elapsed, the processor can set the second object recognition area 931 to be decreased to the size of a third object recognition area 932, based on the initial touch coordinates as a center point.

The object recognition area may be set through Equation (1) below, in such a way that the size is in inverse proportion as time elapses. In the Equation (1) Ad denotes an object recognition area decreased corresponding to time, A1 denotes the initial object recognition area set at touch timing, Td denotes a difference between a touch start timing and a touch release timing, i.e., the touch hold duration, and Te denotes a time (the duration) during which an object recognition area is maintained.

$$Ad = A1 * \left(1 - \frac{Td}{Te}\right) \quad (1)$$

The processor sets an object recognition area to decrease as in the graph shown in FIG. 10A or 10B as time elapses. For example, with reference to FIG. 10A, if a recognition radius of the initial object is 150 pixels, the object recognition radius decreases as time elapses, and is then decreased to zero at a timing when the touch hold duration of 500 ms has elapsed. If the processor ascertains that the touch recognition radius is decreased to zero '0,' the processor may recognize that the object recognition area is limited to a display range of object or the touch input is cancelled.

With reference to FIG. 10B, if the initial object recognition radius is 150 pixels, the object recognition radius decreases as time elapses, i.e., is decreased to approximately 70 pixels at a timing when 250 ms has elapsed, and is maintained at 70 pixels since a time when 250 ms has elapsed. Although the present disclosure is described herein based on the graphs shown in FIGS. 10A and 10B, it should be understood that the forms of the graphs are not limited thereto. The graphs may vary in form, depending on a movement state of an electronic device, an execution app on the foreground screen, the size and type of an object, etc.

The electronic device is capable of generating object recognition areas which differ from each other, in response to the size or form of an object. For example, the object recognition area may be set in various forms, such as circle, ellipse, rectangle, regular quadrilateral, etc., based on initial touch coordinates as a center point.

Figure 11A:
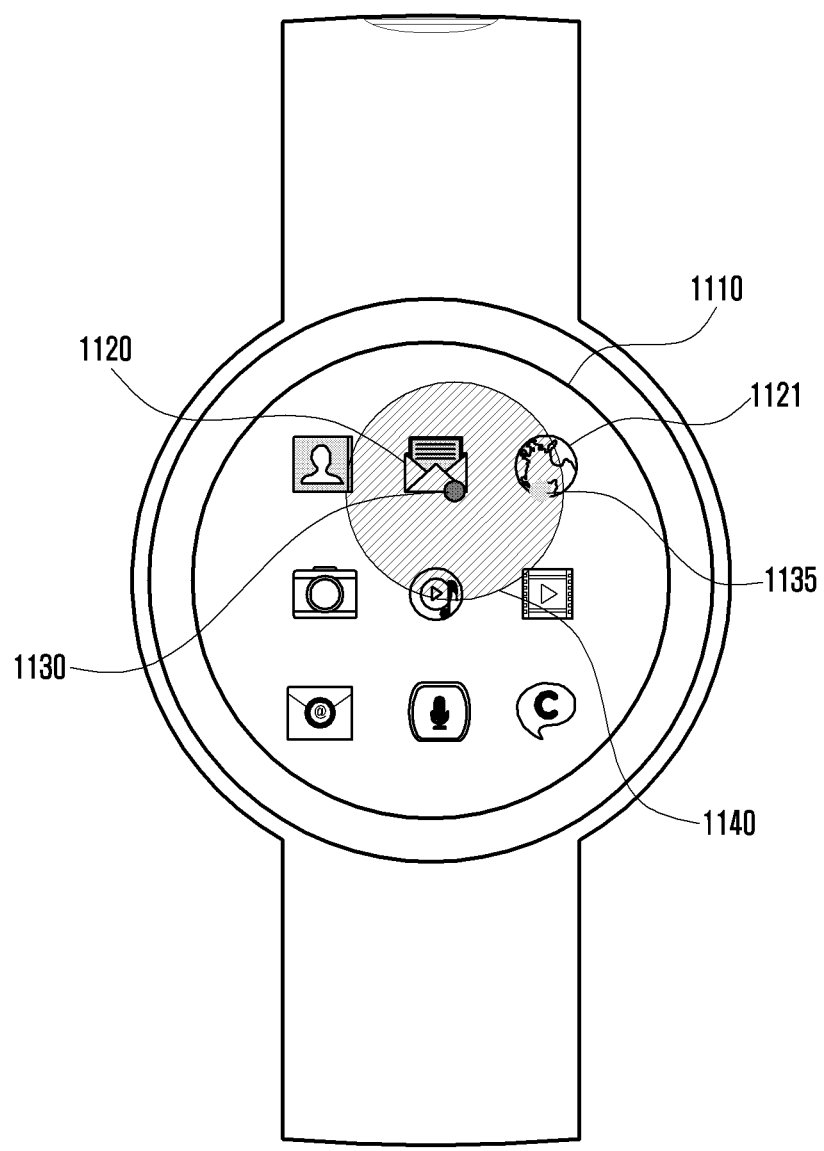
FIGS. 11A and 11B are diagrams illustrating the touch recognition operation, according to an embodiment of the present disclosure.
Figure 11B:
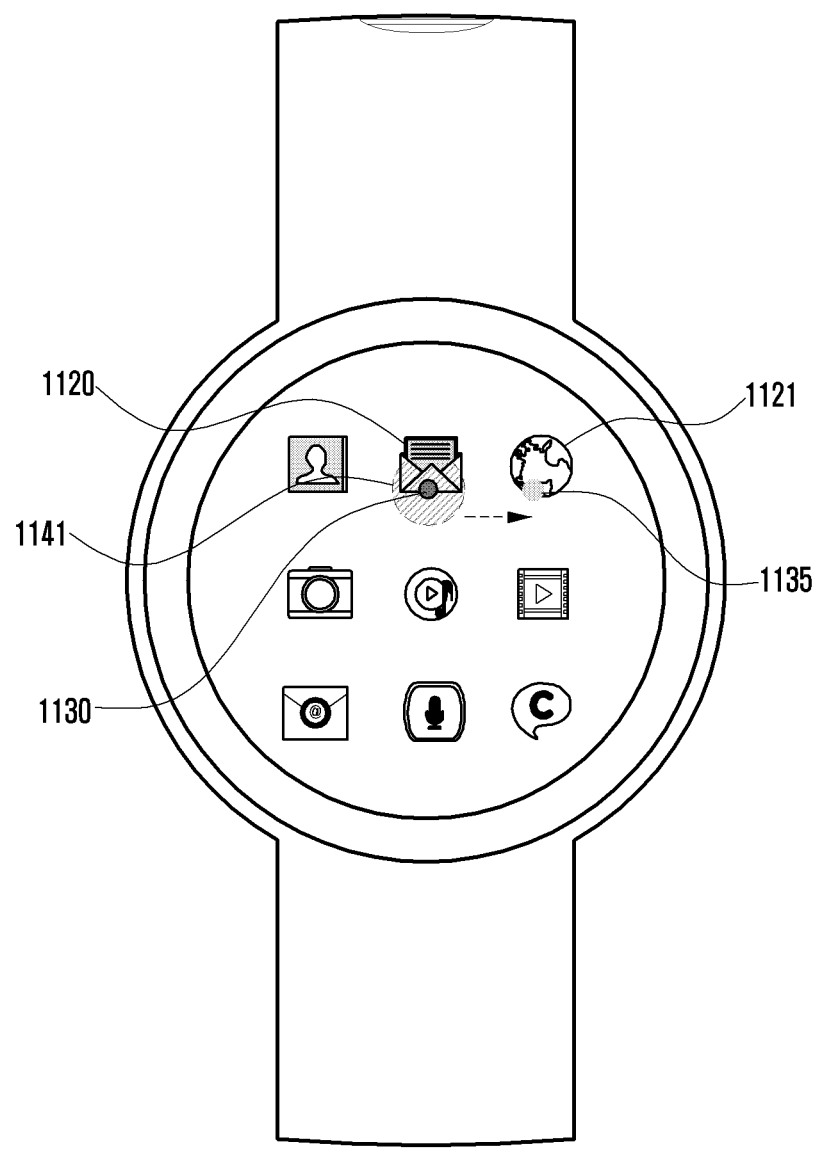

FIGS. 11A and 11B are diagrams of a touch recognition operation, according to an embodiment of the present disclosure.

The electronic device can set locations where a touch input is received so that the locations differ from each other, according to time, based on an object recognition area. For example, although a user applies a touch to a touch screen to execute a specific function, the user may need to cancel the corresponding touch action. The electronic device can support a function for distinguishing a user's various touch gesture actions from an action for cancelling a touch gesture, based on touch signals.

If the electronic device is a wearable device whose display unit has a limited size, the electronic device sets the entire touch panel as a single touch area. If the electronic device ascertains that a user's touch moves outside the touch panel, i.e., the electronic device, with the touch tool (e.g., a user's finger or a pen), the electronic determines that the touch input is cancelled; this configuration causes user inconvenience so that the user needs to move the touch tool (e.g., a user's finger or a pen) outside the touch panel, i.e., the electronic device, in order to cancel the touch action.

The electronic device can set an object recognition area as a condition to determine whether a touch input is cancelled. For example, if a touch release is generated at a location out of the object recognition area which is generated based on the initially touched location, the processor determines that a touch input is cancelled. If a touch release is generated at a location within the object recognition area, the processor determines that a touch is input and executes a function corresponding to the input touch.

With reference to FIG. 11A, the processor of a wearable device can display various screens on the display. The display shows the screen 1110 including at least one of the icons 1120 and 1121. The display may display a screen showing only the time, a screen showing only a user's heath information, etc., according to types of wearable device.

In order to control the wearable device, the user can apply a touch to a first location 1130 on the display. The processor detects that the user touched the first location 1130 and generates an object recognition area 1140 based on the first location 1130. Arrows and indicators 1130 and 1140 are, illustrated on the drawings to assist with the description, but they may not be shown on the display.

The user can release the touch. Since the touch release is generated at a second location 1135 included with the object recognition area 1130 shown in FIG. 11A, the processor determines that a touch signal is a touch input and executes a function corresponding to the touch input.

With reference to FIG. 11B, if a first time has elapsed after the user of a wearable device applied a touch to the first location 1130, the area is decreased in size as an object recognition area 1141. In order to cancel the touch input, the user can move the touch to a location (e.g., the area 1121 of the second object) instead of the area 1120 of the first object. In this case, since the object recognition area is decreased in size, if the processor detects a touch release at the second location 1135, it recognized that a touch input is cancelled. This configuration allows the user to cancel the touch input by only moving the touch a relatively short distance, according to a user's convenience, instead of moving the touch outside the entire touch panel of the wearable device.

If the electronic device with a touch screen, set to recognize a touch panel as a single touch range, detects a touch applied to the touch panel, the electronic device can set an object recognition area, based on a first location touched, separately from the single touch range. If the touch moves to a location out of the set object recognition area, the electronic device recognizes the touch as a cancel input. Location information to recognize the touch as a cancel input may vary as the object recognition area is adjusted based on the touch hold duration.

A touch screen display of the electronic device, or a touch panel, can include an active area displaying the screen and an inactive area around the active area. The electronic device sets a touch recognition area within the active area, based on the first touched location, determines whether the second location from which the touch is released is within a touch recognition area generated within the active area, and recognizes that the touch is input or the touch input is cancelled, based on the determination.

Figure 13:
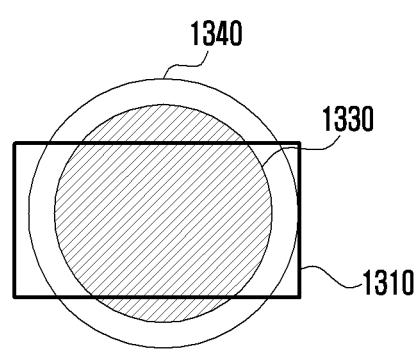
FIG. 13 is a diagram of a process of correcting an object recognition area in an electronic device, according to an embodiment of the present disclosure.

FIG. 12 is a flowchart of a touch input recognition method of an electronic device, according to an embodiment of the present disclosure. FIG. 13 is a diagram of a process of correcting an object recognition area in an electronic device, according to an embodiment of the present disclosure.

With reference to FIGS. 12 and 13, the processor of the electronic device can detect (or receive) a sensed touch signal from a touch screen in step 1210. The touch screen may be in a state displaying a screen including at least one object (e.g., icon, app, execution key, list item, etc.).

The processor can store the initial touch coordinates (X1, Y1) of a location at which a touch signal is initially generated and the initial touch time T1 in response to the touch signal in step 1220.

The processor determines whether a touch release event is detected based on a condition as whether a touch signal is received in step 1230. If the processor does not receive a touch signal from the touch screen, the processor may ascertain that the touch is released.

If a touch release is not generated and a touch is held during a period of time set corresponding to a long press input, the processor determines the touch signal as a long press input in step 1235. The processor executes a function corresponding to the long press input in step 1237.

If the processor ascertains that the touch is released, the processor identifies touch coordinates of a touch signal which is last received, and store the last touch release coordinates (X2, Y2) and the touch release time T2 in step 1240.

The processor determines (or generates) an object recognition area A1 based on the touch hold duration in step 1250. The processor measures and ascertains the touch hold duration, based on the initial touch time T1 and touch release time T2.

The processor can correct the size of the object recognition area, based on the movement of the electronic device and/or the screen information regarding the electronic device in step 1260.

Figure 14:
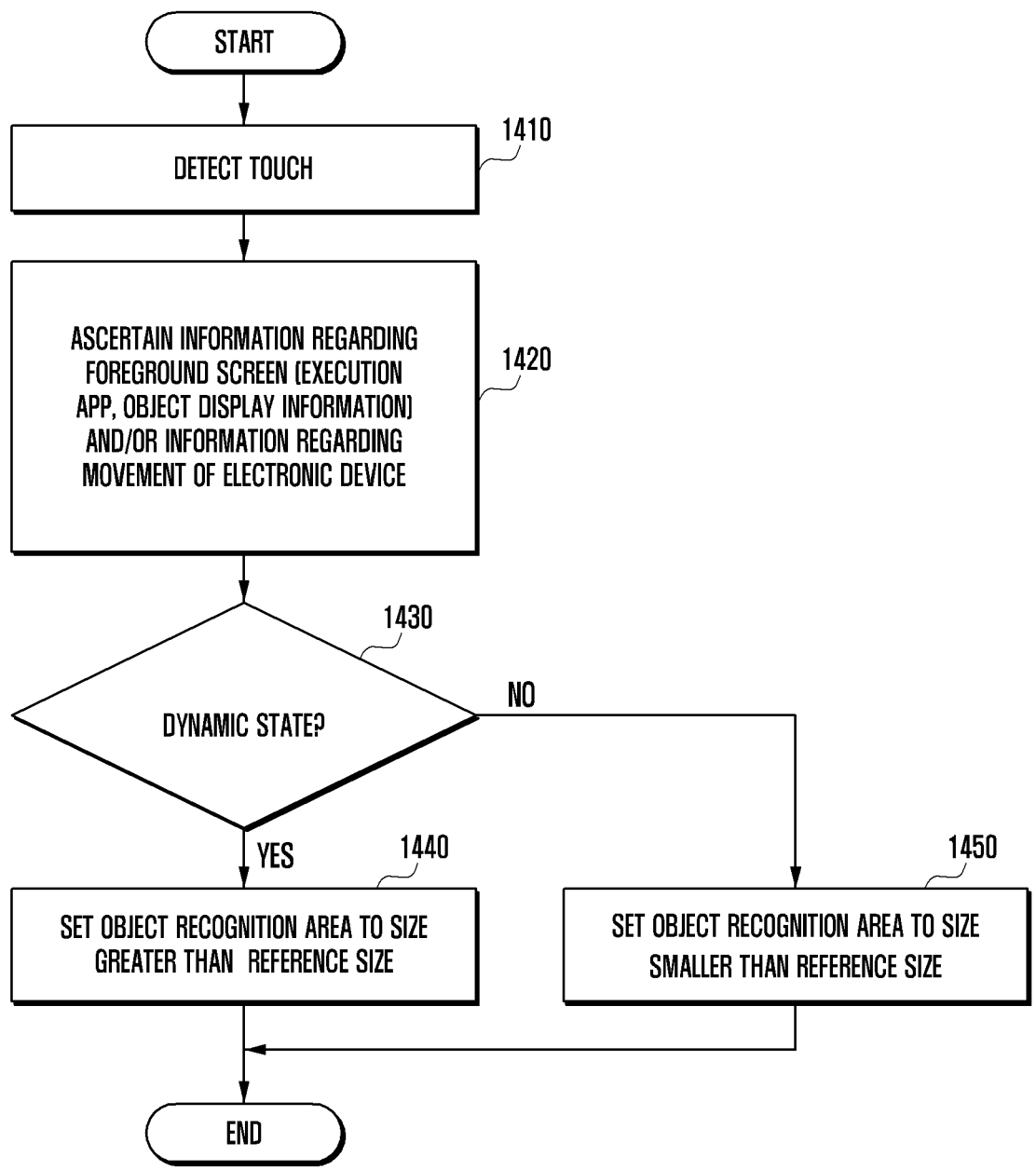
FIG. 14 is a flowchart of a touch recognition method, according to an embodiment of the present disclosure.

The correction process in step 1260 may be identical to that of FIG. 14. The processor performs the correction in such a way as to determine an object recognition area A1 decreased gradually from a reference size as the touch hold duration elapses and enlarge or reduce the determined object recognition area A1 in size to the area A2, based on at least one of a type of app executed on the screen, a form and size of an object displayed on the screen and the movement state of the electronic device. The electronic device may set a correction value so that the object recognition area is enlarged or reduced, depending on the states of the electronic device.

As shown in FIG. 13, the processor generates an object recognition area based on an initially touched location. Reference number 1330 indicates an object recognition area, and reference number 1340 indicates an area created as the object recognition area 1330 is corrected based on the movement of an electronic device and the screen information regarding the electronic device.

The object recognition area 1330 may be an area A1 created as an initial object recognition area A is adjusted in size in response to the touch hold duration. The corrected object recognition area 1340 may be an area A2 created as the object recognition area A, adjusted in size in response to the touch hold duration, is corrected to be enlarged or reduced in size based on the movement of an electronic device or the screen information regarding the electronic device.

The processor can obtain a sensed value from a sensor unit of the electronic device, i.e., sensors, such as a vibration sensor, an acceleration sensor, a gyro sensor, an image sensor, a terrestrial magnetism sensor, an atmospheric pressure sensor, a biometric sensor, etc. (see FIG. 2, for example), and determine whether the electronic device is in a static state or a dynamic state, based on the sensed value. The static state may be a state when the electronic device does not move or moves within a threshold. The dynamic state may be a state when the movement of the electronic device is greater than a threshold (e.g., a user walks or runs, carrying the electronic device).

If the electronic device is in a static state, the error probability of touching a location is relatively low, and thus the electronic device may set a correction value so that the object recognition area is reduced in size. If the electronic device is in a dynamic state, the error probability of touching a location is relatively high, and thus the electronic device may set a correction value so that the object recognition area is increased in size.

As another example, if the electronic device identifies an app being executed on the current screen, and ascertains that the executed app is a type of app which needs a dynamic state, e.g., an app measuring momentum, the electronic device may set a correction value so that the object recognition area increases in size.

If the electronic device ascertains that the size of an object at a location to which a touch is applied is less than a preset reference value, the electronic device may set a correction value so that the object recognition area is increased in size.

If a default form of an object recognition area is a circle, the processor identifies the form of the object at a location to which a touch is applied and ascertains that the identified object form is a rectangle form or a regular quadrilateral form. In this case, the processor corrects the form of the object recognition area to a rectangle form or a regular quadrilateral form, according to the object form.

The processor can determine whether the touch release coordinates are included in a display range of object in step 1270. For example, the processor ascertains foreground screen information displayed on the display panel, and detects a location of the object displayed on the screen and a display range of object.

If the processor ascertains that the touch release coordinates are out of a range of displaying an object in step 1270, the processor can determine whether the touch release coordinates are included in the corrected, object recognition area A2 in step 1275. If the processor ascertains that the touch release coordinates are included in the object recognition area, the processor proceeds with step 1280 and recognizes the touch signal as a touch input selecting an object.

If the processor ascertains that the touch release coordinates are included in a display range of an object, the processor recognizes the input as a touch and touch release action selecting an object in step 1280. The processor can execute a function corresponding to the input selecting an object, and control the display to display the executed function on the display panel.

If the processor ascertains that the touch release coordinates are out of a range of displaying an object in step 1270 and the corrected, object recognition area A2 in step 1275, the processor recognizes that the touch input in response to the touch signal is cancelled in step 1290.

FIG. 14 is a flowchart of a touch recognition operation, according to an embodiment of the present disclosure.

The processor of the electronic device can sense a touch in step 1410. The processor of FIG. 14 may operate in parallel with the operations of the processor of FIG. 6 or 12, or may be included in part of them.

The processor can identify (or obtain) the screen information and/or the movement information regarding the electronic device in step 1420. The processor can determine whether the electronic device is in a dynamic state in step 1430. If the processor ascertains that the electronic device is in a dynamic state in step 1430, the processor can set the object recognition area to have a size greater than a preset reference size in step 1440. On the other hand, if the processor ascertains that the electronic device is not in a dynamic state in step 1430, the processor can set the object recognition area to maintain a preset reference size or to have a size less than a reference size in step 1450.

A method of recognizing a touch input in an electronic device may be configured in such a way to include receiving a touch input selecting an object displayed on a touch screen display; detecting a first location corresponding to the received touch input on the touch screen display; setting an area related to the first detected location, based on at least one condition; detecting, if the touch input is released, a second location on the touch screen display from which the touch input is released; determining whether the second detected location is within the set area; and determining whether at least one function is executed, based on the determination.

Determining whether at least one function is executed may further include executing at least one function corresponding to the selection of the object if the first location is included within a display range of an object displayed on the touch screen display, and if the second location is included within a display range of an object or the set area; and recognizing the touch input selecting the object as an cancel input if the second location is outside the display range of object or the set area.

Detecting a first location may include recognizing that the object has been selected if the first location is within a display range of an object displayed on the touch screen display; displaying information notifying that an object has been selected, on the touch screen display; and cancelling, if a touch input selecting the object is recognized as a cancel input, the display of information notifying that the object has been selected.

Setting an area related to the first detected location may further include storing touch coordinates of the first location and touch coordinates of the second location; measuring the touch hold duration corresponding to a difference between a timing when the touch input is received and a timing when the touch input is released; and adjusting the set area to decrease in size as the touch hold duration has elapsed.

Setting an area related to the first detected location may further include adjusting the reference size of the set area to increase or decrease, based on at least one of a type of app executed on the screen of the touch screen display, the size of an object displayed on the screen; and the movement state of the electronic device.

Setting an area related to the first detected location may further include determining a movement state of the electronic device using a sensed value transferred from a sensor unit; and adjusting, if the degree of movement of the electronic device is greater than a preset threshold, the set area to be greater than the reference size.

Receiving a touch input may include measuring the pressure of touch according to the touch input; determining, based on the pressure of a touch sensed at the first touched location, if the pressure of a touch is greater than a preset threshold, the size of the initially set area to have a size smaller than a reference size; and determining, if the pressure of a touch is less than or equal to a preset threshold, the size of the initially set area to have a size greater than a reference size.

Figure 15:
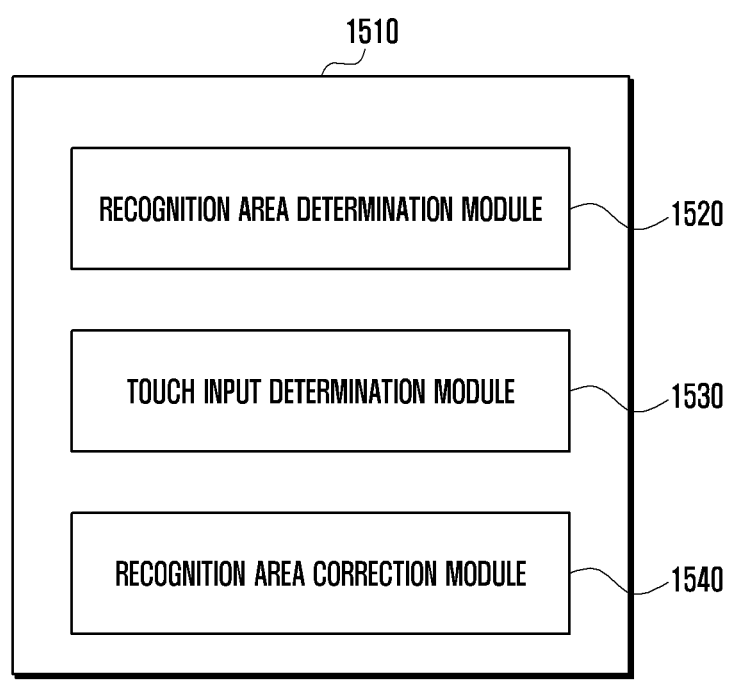
FIG. 15 is a diagram of a configuration of a processor, according to an embodiment of the present disclosure.

FIG. 15 is a diagram of a processor, according to an embodiment of the present disclosure.

A processor 1510 can include a recognition area determination module 1520, a touch input determination module 1530, and a recognition area correction module 1540. The processor 1510 may be the processor of FIG. 1 and/or FIG. 2.

The recognition area determination module 1520 receives a touch signal from a touch screen, and identifies initial touch coordinates (X1, Y1) based on the touch signal. The touch signal transferred from the touch screen may include touch coordinates.

The recognition area determination module 1520 can generate a certain form of object recognition area, based on the initial touch coordinates as a center point. The object recognition area may be set in various forms such as a rectangle, a regular quadrilateral, a circle, an ellipse, etc., according to the settings. The object recognition area may be set the initial recognition range to a radius of 150 pixels as a default value based on the initial touch coordinates, but is not limited thereto. The object recognition area may be set to be greater or less than a preset reference value, based on at least one of a type of electronic device, a type of executed app displayed on the screen, screen information, and the movement information regarding the electronic device. For example, if the electronic device is equipped with a display unit whose size is limited, e.g., a display unit of a wearable device, the electronic device displays icons in relatively small size. Therefore, the electronic device may set the initial touch recognition range to be less than a reference value.

The recognition area determination module 1520 can determine the initial object recognition area based on the initial touch coordinates, and adjust the object recognition area to decrease in size as the touch hold duration elapses. The decrease rate of the object recognition range may be decreased by a certain size every a certain time interval. The decrease rate of the object recognition area may depend on the settings, and may be set differently, according to a type of app, a form of object, or a movement state of the electronic device. For example, the recognition range determination module controls the recognition range to decrease by, e.g., 20 to 50 pixels, every a time interval of 100 ms, but is not limited thereto. The initial object recognition area may be set to a size greater than a display range of object, and the object recognition area may decrease in size as the touch hold duration elapses. If the object recognition area decreases in size to be less than the display range of object, the processor may not perform the size adjusting process.

The recognition area determination module 1520 determines an object recognition area, based on information regarding graphs stored in the memory, and decreases the size of the determined, object recognition area range as time elapses.

An object recognition area for the touch hold duration may be determined using values of graphs shown in FIGS. 20A to 20E. In the graph shown in FIG. 20A, an object recognition area may be determined by the Equation (2).

$$Ad = A1 * \left(1 - \frac{Td}{Te}\right) \quad (2)$$

Figure 20A:
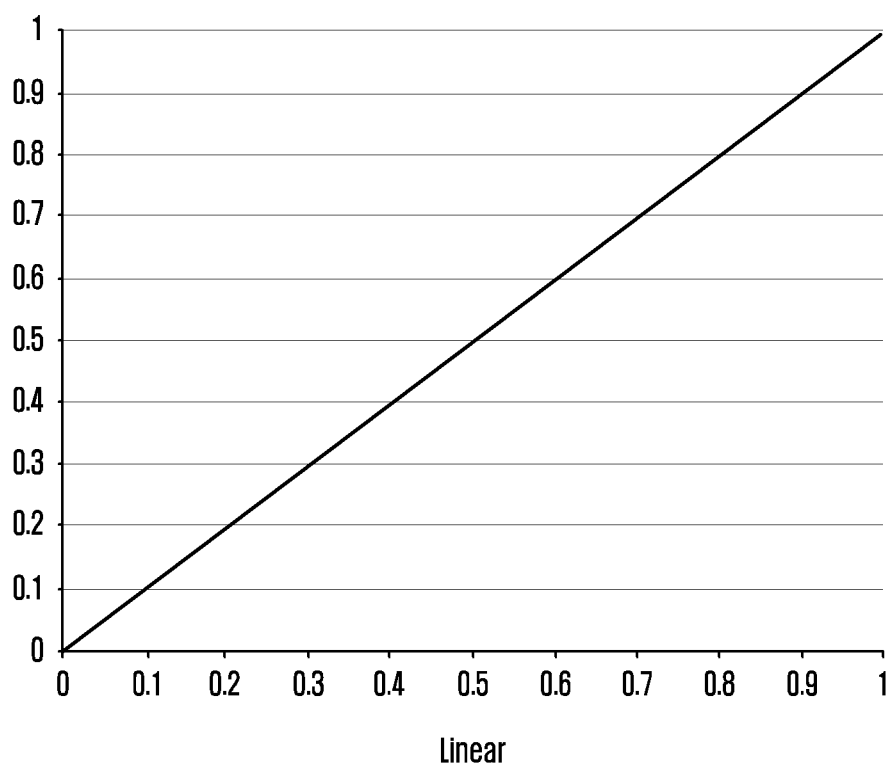
FIGS. 20A to 20E are graphs from an object recognition area, according to an embodiment of the present disclosure.
Figure 20B:
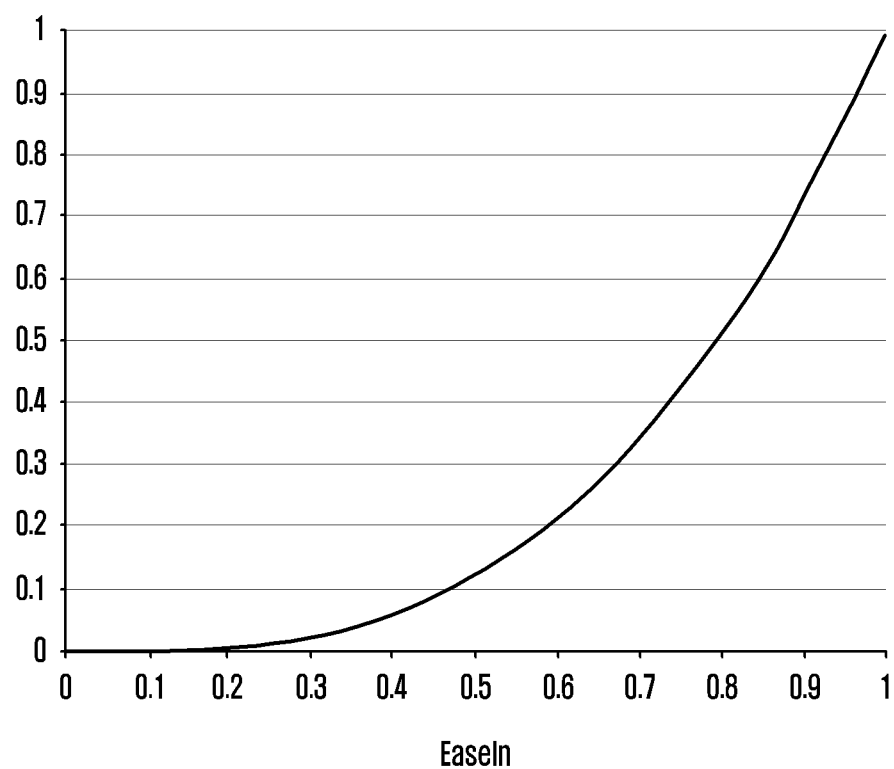
Figure 20C:
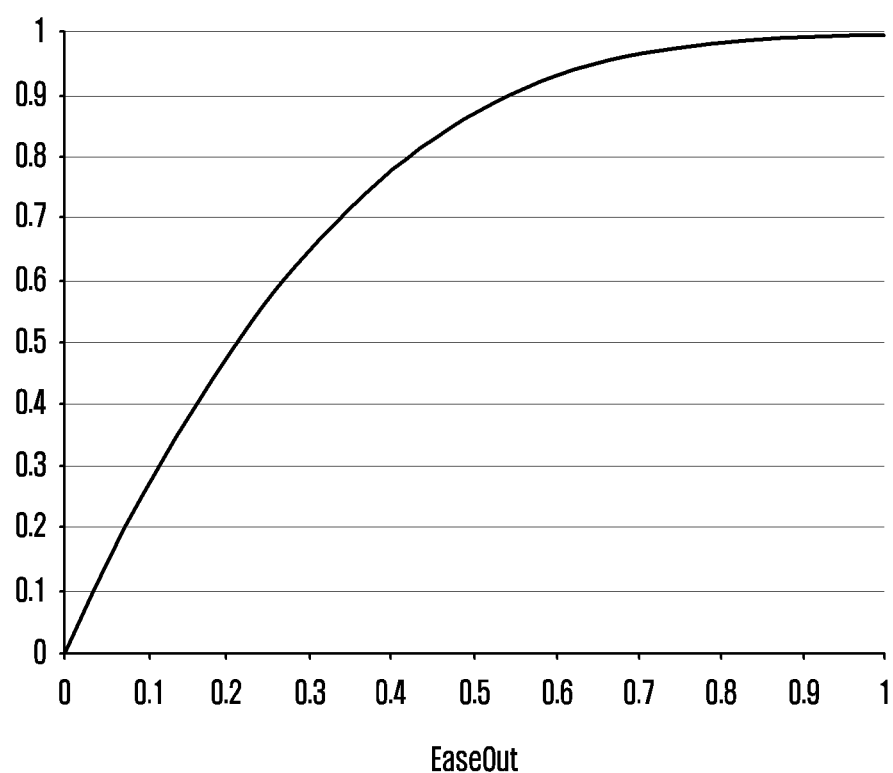
Figure 20D:
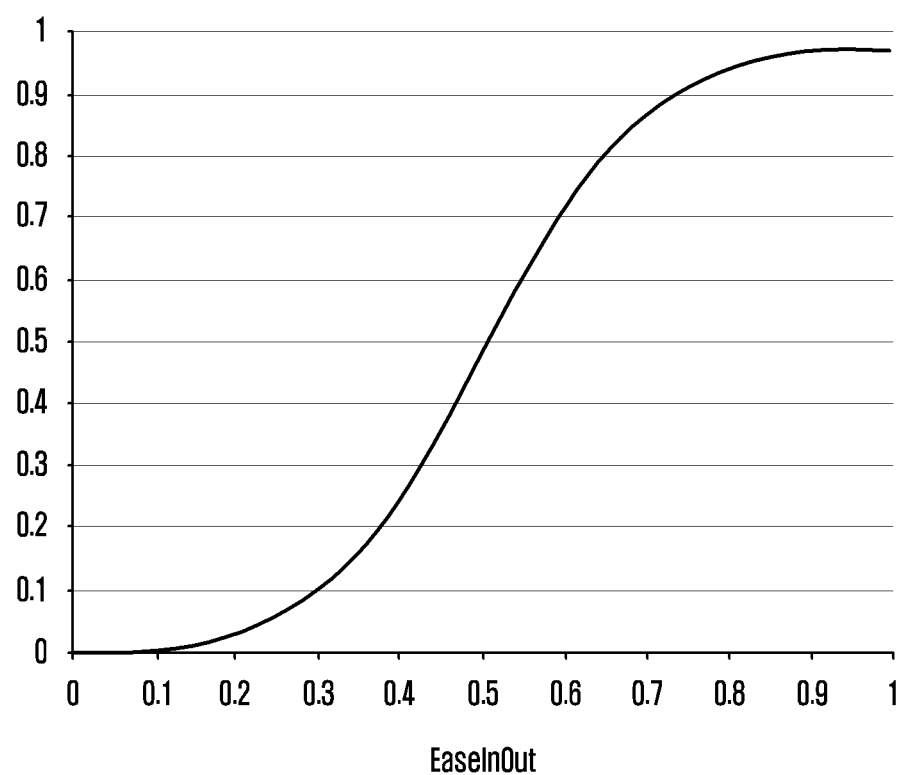
Figure 20E:
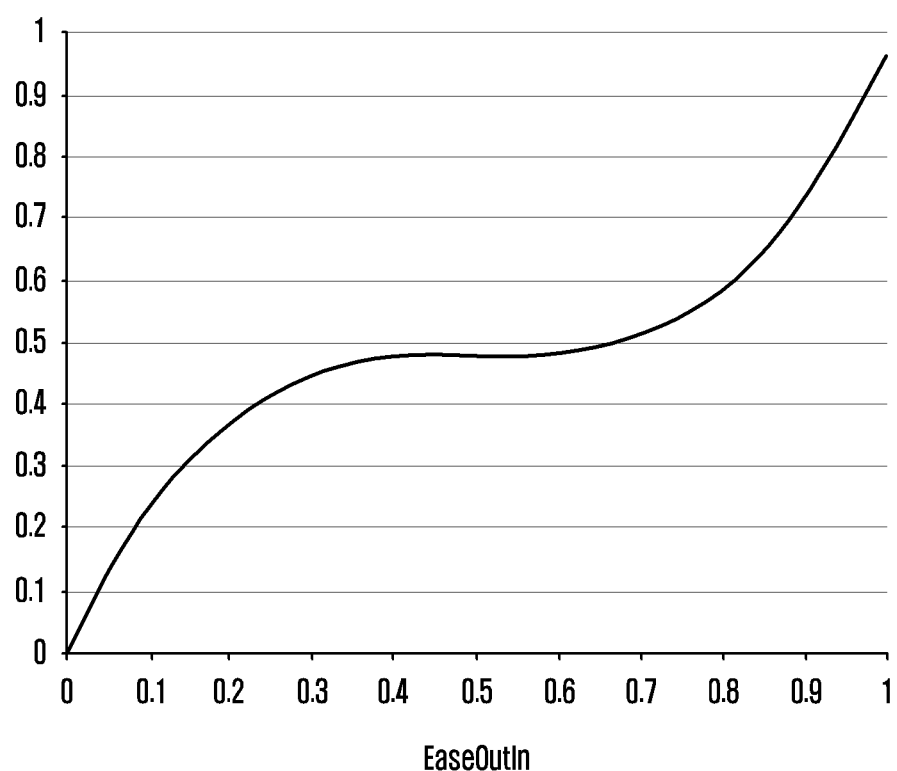

In Equation (2), Ad denotes an object recognition area decreased corresponding to time, A1 denotes the initial object recognition area set at touch timing, Td denotes a difference between a touch start timing and a touch release timing, i.e., the touch hold duration, and Te denotes a time (the duration) during which an object recognition area is maintained. Object recognition areas may be determined using equations for values of graphs shown in FIGS. 20B to 20E. For example, FIG. 20B is a graph showing an exponential function, and FIG. 20C is a graph showing a logarithmic function. FIG. 20D is a graph showing an ease-in-out function, and FIG. 20E is a graph showing an ease-out-in function. The recognition area determination module 1520 can determine various sizes of object recognition area, according to the change of time value. Since equations for individual graphs are well-known in the art, a detailed description is omitted.

If the touch input determination module 1530 detects an initial touch signal from the touch screen, the touch input determination module 1530 identifies the touch coordinates and determining whether an object is selected. If an object is selected by a touch, the touch input determination module 1530 displays information indicating that an object has been selected on the display. For example, if an object is selected by a touch, the touch input determination module 1530 controls the display to showing the selected object in a floating state on the display.

The touch input determination module 1530 can determine whether touch release coordinates are within a display range of object. For example, the processor can detect screen information displayed on the display panel and identify a location of an object displayed on the screen and a display range of object. If the touch input determination module 1530 ascertains that touch release coordinates are within a display range of object, the touch input determination module 1530 determines (or recognizes) the touch signal as a touch input selecting an object. The touch input determination module 1530 can execute a function corresponding to the input selecting an object, in response to the touch release, and control the display of the executed function.

If the touch input determination module 1530 ascertains that touch release coordinates are out of a display range of object, the touch input determination module 1530 determines whether the touch release coordinates are included in the determined object recognition area. If touch release coordinates are out of a display range of object, but are included in an object recognition area range, the touch input determination module 1530 can determine the touch signal as a touch input selecting an object.

If the touch input determination module 1530 ascertains that the touch release coordinates are out of a display range of object and also the determined object recognition area, the touch input determination module 1530 recognizes the touch signal as the cancellation of a touch input. If the touch input determination module 1530 recognizes the touch signal as the cancellation of a touch input, the touch input determination module 1530 may not display information indicating that an icon has been selected on the display. For example, while the touch input determination module 1530 controls, if an object is selected by a touch, the object to be shown in a floating state, if the touch input determination module 1530 ascertains that the touch input is cancelled, the touch input determination module 1530 may return the display of the object to a default state.

The recognition area correction module 1540 can correct an object recognition area, based on the movement of electronic device and/or the screen information regarding the electronic device. For example, the recognition area correction module 1540 corrects the object recognition area to increase or decrease to a size greater or less than a reference size, based on at least one of a type of app executed on the screen, the size and form of an object displayed on the screen, and the movement state of the electronic device. The electronic device may set a correction value, depending on its movement state.

The recognition area correction module 1540 can obtain a sensed value from a sensor unit of the electronic device, i.e., sensors, such as a vibration sensor, an acceleration sensor, a gyro sensor, an image sensor, a terrestrial magnetism sensor, an atmospheric pressure sensor, a biometric sensor, etc., and determine whether the electronic device is in a static state or a dynamic state, based on the sensed value.

If the recognition area correction module 1540 identifies an app being executed on the foreground screen, and ascertains that the executed app is a type of app which needs a dynamic state, e.g., an app measuring momentum, the recognition area correction module 1540 can correct the object recognition area to increase in size.

If the recognition area correction module 1540 ascertains that the size of an object at a location to which a touch is applied is less than a preset reference value, the recognition area correction module 1540 can generate the initial object recognition area to be greater than a reference size.

If a default form of an object recognition area is a circle, the recognition area correction module 1540 identifies the form of the object at a location to which a touch is applied and ascertains that the identified object form is a rectangle form or a regular quadrilateral form. In this case, the recognition area correction module 1540 can correct the form of the object recognition area to a rectangle form or a regular quadrilateral form, according to the object form.

The recognition area correction module 1540 can correct object recognition areas determined by the recognition area determination module 1520, using correction values according to conditions, as shown in FIGS. 21A to 21F. Graphs illustrated in FIGS. 21A to 21E show easing functions which may be used to change object recognition areas in various forms according to one or more conditions.

Figure 21A:
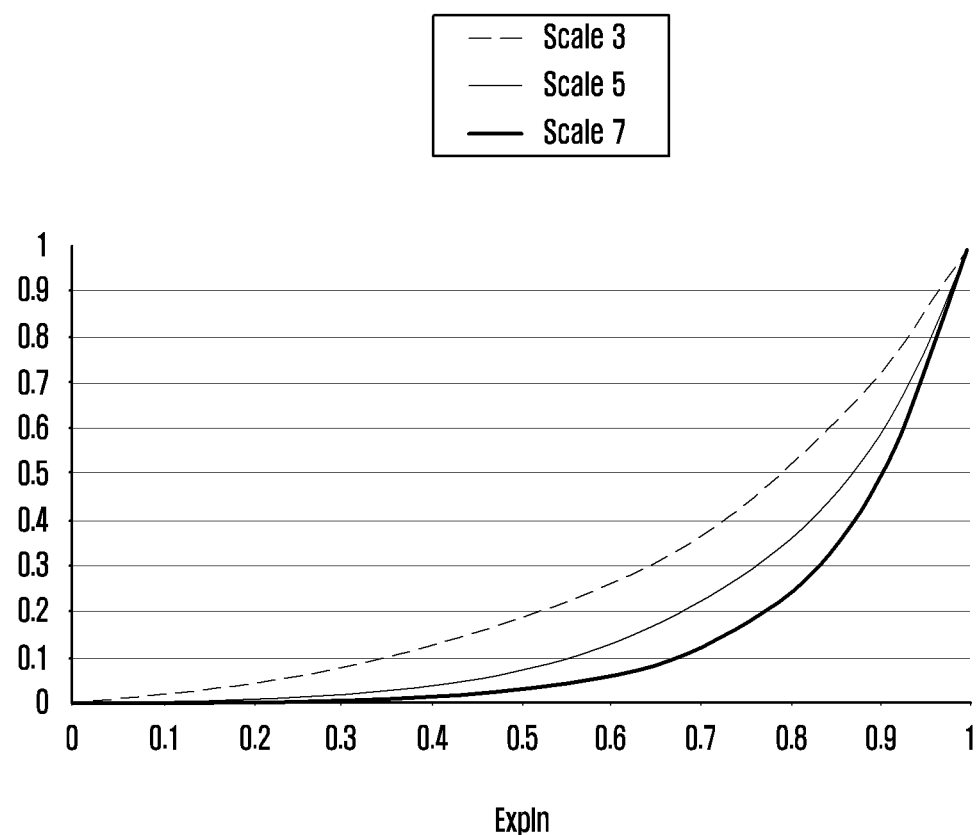
FIGS. 21A to 21F are graphs from the object recognition area and correction area, according to an embodiment of the present disclosure.

FIG. 21A is an exponential function whose curve slope increases in proportion to the increase of a scale value. With reference to graph shown in FIG. 21A, the processor sets the sizes of the object recognition area according to conditions, varying the decrease magnitude of size as time elapses.

Figure 21B:
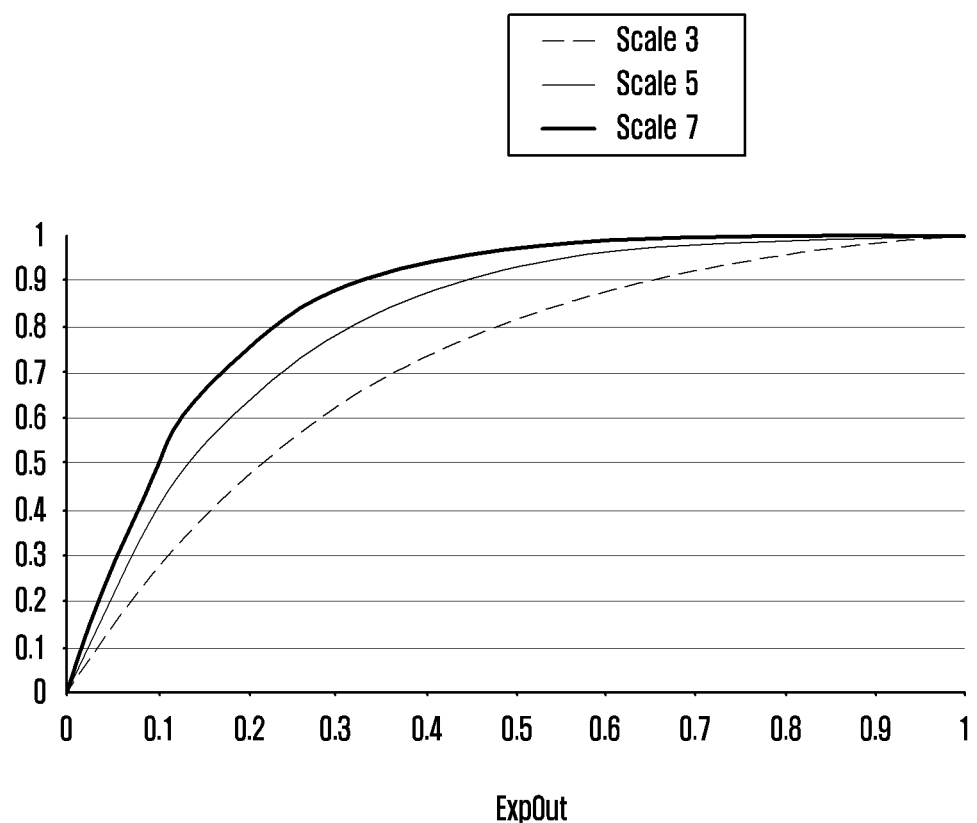

FIG. 21B is a graph showing a logarithmic function. With reference to FIG. 21B, the processor sets the sizes of the object recognition area according to conditions, varying the decrease magnitude of size, as time elapses, by employing a logarithmic function value.

Figure 21C:
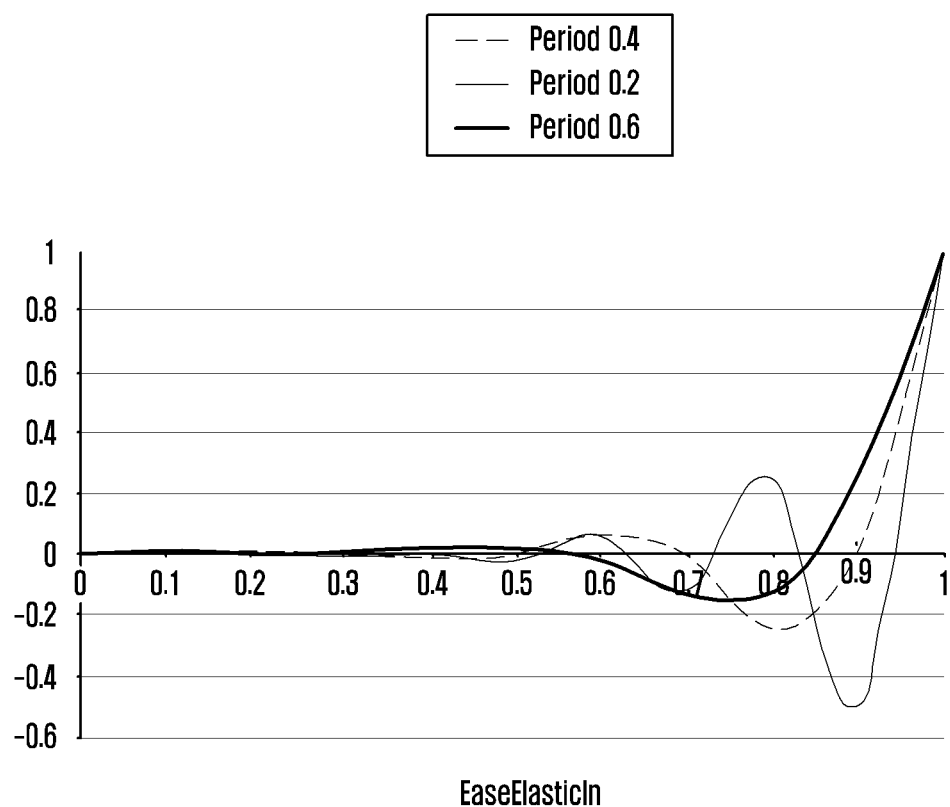

FIG. 21C is a graph showing that the speed in falling increases/decreases. In this graph, the period is a falling time. The processor detects the movement of the electronic device, through information collected from various sensors included in the electronic device. If the processor ascertains that the electronic device falls from top to down, the processor may alter the size of the object recognition area, referring to graph shown in FIG. 21C.

Figure 21D:
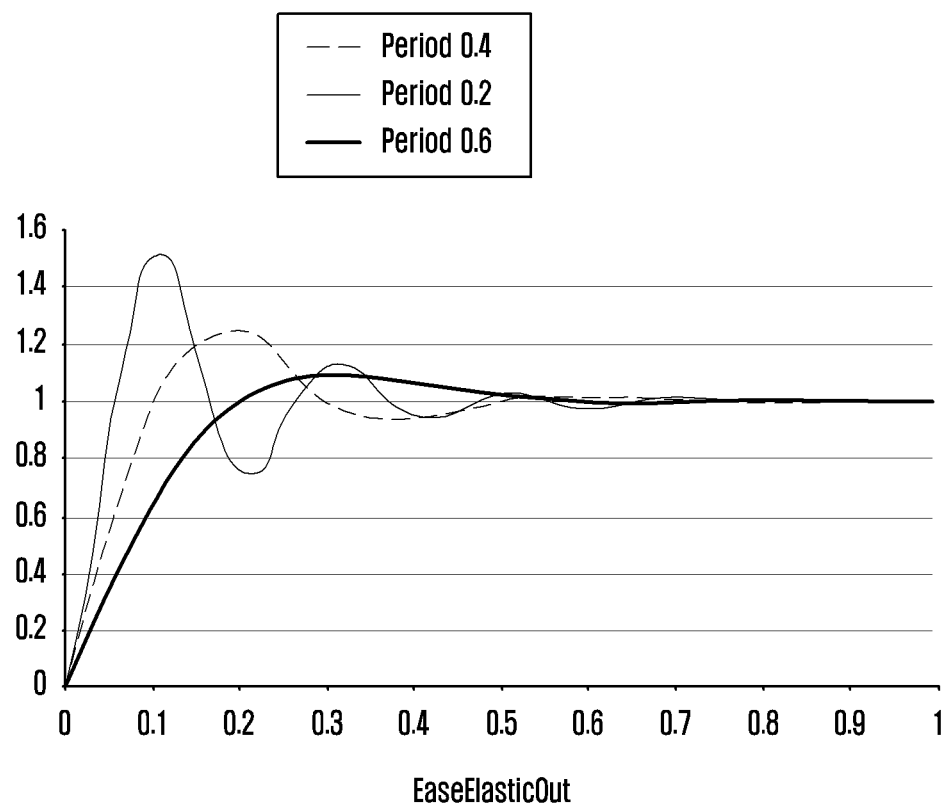

In contrast, FIG. 21D is a graph showing that the speed in rising increases/decreases. In this graph, the period is a rising time. The processor detects the movement of the electronic device. If the processor ascertains that the detected movement complies with a condition, the processor may alter the size of the object recognition area, referring to graph shown in FIG. 21D.

Figure 21E:
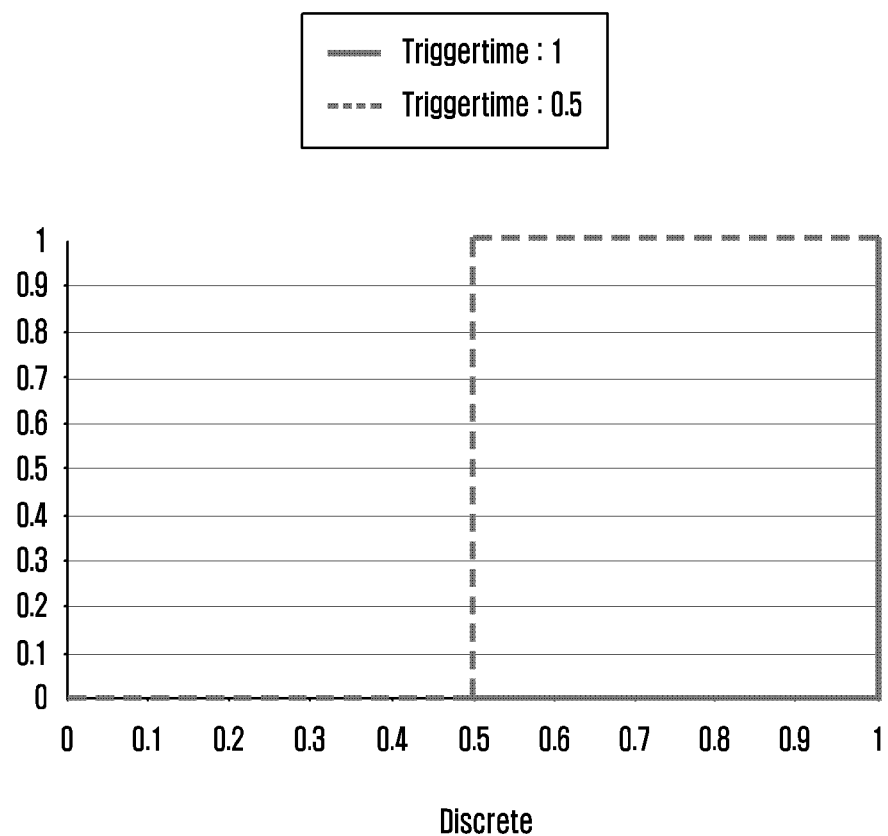

FIG. 21E is a graph showing a discrete function. The processor can adjust a time for generating an object recognition area, referring to the graph shown in FIG. 21E. For example, the processor generates an object recognition area for a period of time (500 ms), and sets the object recognition area generating time so that a touch is recognized in a display range of object, except for the object recognition area after the period of time (500 ms) has elapsed.

Figure 21F:
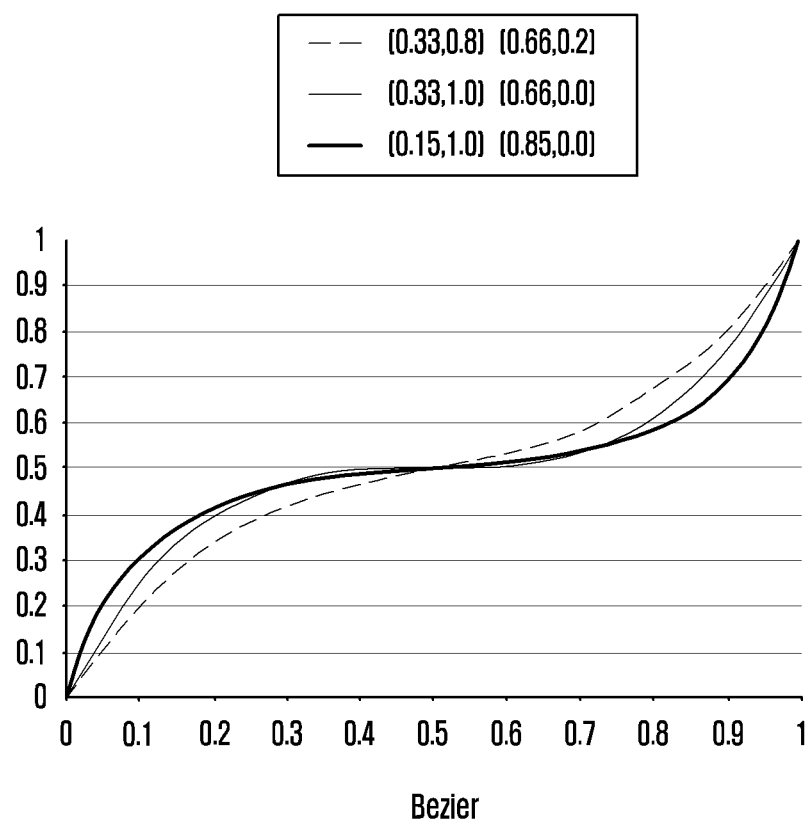

FIG. 21F is a graph showing a cubic Bezier function. With reference to FIG. 21F, the processor alters the object recognition area of a set reference size to have different sizes according to various conditions.

The electronic device is capable of further including a sensor for sensing the pressure of touch. The processor of the electronic device identifies information regarding the pressure of touch sensed at a location to which a touch is applied. If the pressure of touch is greater than a preset threshold, the processor determines the initially generated object recognition area as a size less than a reference size. If the pressure of touch is less than a preset threshold, the processor determines the initially generated object recognition area as a size greater than a reference size. In the following description, the configuration of the electronic device capable of sensing the pressure of touch is explained.

An electronic device may be configured in such a way as to include a touch screen display; a processor electrically connected to the touch screen display; and a memory electrically connected to the processor. The memory stores instructions that enable the processor to: receive a touch input applied to the touch screen display; detect a first location of the received touch input on the touch screen display; set an area related to the first detected location on the touch screen display, based on at least one condition; detect, if the received touch input is released, a second location on the touch screen display from which the touch input is released; determine whether the second detected location is within the set area; and determine whether at least one function is executed, based on the determination.

The processor recognizes touch coordinates of the first location and touch coordinates of the second location; detects the touch hold duration corresponding to a difference between a timing when the touch input is received and a timing when the touch input is released; and adjusts the set area to decrease in size as the touch hold duration has elapsed.

The processor ascertains, if the first location is included within a display range of an object displayed on the touch screen display, that the object is selected; controls the touch screen display to display information indicating that the object has been selected; and executes, if the second location is included within a display range of an object or the set area, at least one function corresponding to the selection of the object; and recognizes, if the second location is outside the display range of object or the set area, a touch selecting the object as an cancel input; and controls the touch screen display to cancel the display of information indicating that the object has been selected.

The touch screen display includes an active area displaying a screen and an inactive area around the active area. The instructions enable the processor to cancel the touch input, based on at least part of the determination as to whether the second location is within the touch recognition area created in an active area of the touch screen display.

The processor measures the touch hold duration from a timing when the touch signal is generated, and decreases the size of the touch recognition area generated in the active area as the touch hold duration has elapsed.

The processor adjusts the reference size of the initially set area to increase or decrease, based on at least one of a type of app executed on the screen of the touch screen display, the size of an object displayed on the screen; and the movement state of the electronic device.

The electronic device may further include a sensor unit for sensing a movement state of the electronic device. The processor adjusts, if the degree of movement of the electronic device is greater than a preset threshold, the set area to be greater than the reference size, based on a sensed value transferred from the sensor unit.

The memory comprises reference information to classify application programs into a dynamic program. The processor adjusts the set area to be greater than a reference size, if a type of app, executed on the screen of the touch screen display, is classified into a dynamic program related to the momentum or movement of the electronic device.

The processor detects a form of an object displayed on the touch screen display screen and sets the detected object to the form of the set area.

The processor decreases the set area, gradually, by a certain size, each time when the touch hold duration elapses periodically at a certain time interval.

The processor shares the first location as a center point, and adjusts the set area to decrease in size.

The electronic device may further include a sensor for sensing the pressure of touch according to a touch input. The processor determines, based on the pressure of a touch sensed at the first touched location: if the pressure of a touch is greater than a preset threshold, the size of the initially set area to have a size smaller than a reference size; and if the pressure of a touch is less than or equal to a preset threshold, the size of the initially set area to have a size greater than a reference size.

Figure 16:
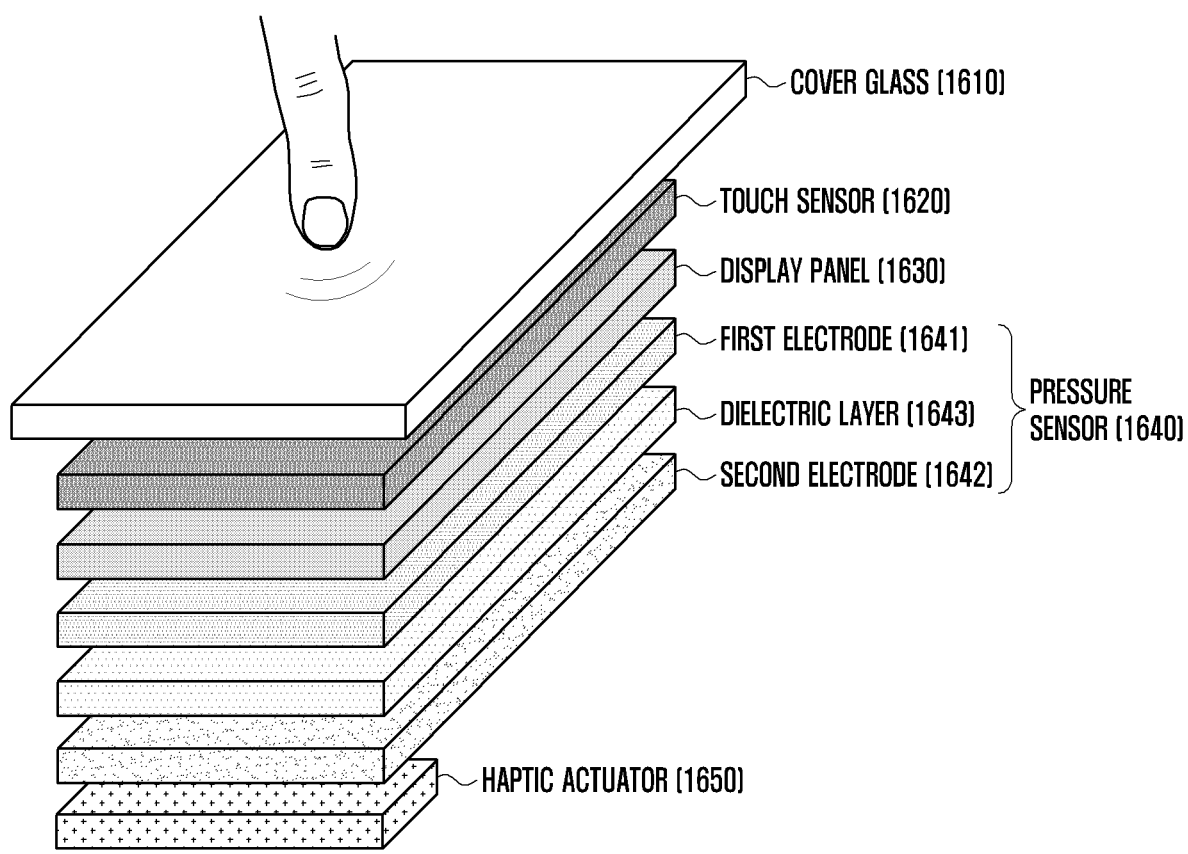
FIG. 16 is a diagram of a layer structure of components included in an electronic device, according to an embodiment of the present disclosure.

FIG. 16 is a diagram of the layer structure of components included in an electronic device, according to an embodiment of the present disclosure. The layer structure shown in FIG. 16 may be applied to the display 110 of FIG. 1. Therefore, the configurations shown in FIG. 16 may be disposed between the front side (first side) and the rear side (second side) of the electronic device 101 of FIG. 1.

In the layer structure of the display, a cover glass 1610 allows light generated by the display panel 1630 to pass through it. If a user of the electronic device contacts the cover glass 1610 with part of his/her body (e.g., finger), a touch (including contact using a stylus pen) may be sensed. The cover glass 1610 may be formed of any suitable material including, but not limited to, tempered glass, reinforced plastics, flexible polymer materials, etc. The cover glass 1610 protects the display and electronic device with the display against external impacts. The cover glass 1610 may also be referred to as a glass window or a cover window.

A touch sensor 1620 receives a touch of an external tool and changes in various physical quantities (e.g., voltage, light quantity, resistance, charge quantity, capacitance, etc.). The touch sensor 1620 detects at least one location of touch by an external tool on the display (e.g., the surface of the cover glass 1610), based on the change in a physical quantity. For example, the touch sensor 1620 may include a capacitive touch sensor, a pressure touch sensor, an infrared touch sensor, a resistive film touch sensor, a piezo touch sensor, etc. The touch sensor 1620 may vary according to the specific functions that it performs, e.g., a touch panel, etc.

A display panel 1630 outputs content and/or items (e.g., text, images, videos, icons, widgets, symbols, etc.). The display panel 1630 can include an LCD panel, an LED display panel, an OLED display panel, MEMS display panel, an electronic paper display panel, etc.

The display panel 1630 may be implemented into a single body with the touch sensor (or touch panel) 1620. In this case, the display panel 1630 may also be referred to as a touch screen panel (TSP) or a touch screen display panel.

A pressure sensor 1640 detects pressure (or force) that an external tool applies to the display (e.g., the surface of the cover glass 1610). The pressure sensor 1640 can include a first electrode 1641, a second electrode 1642, and a dielectric layer 1643. The pressure sensor 1640 detects the pressure of touch, based on a capacitance between the first electrode 1641 and the second electrode 1642 which varies according to the pressure of touch applied to the display panel. In FIG. 16 the pressure sensor 1640 is implemented with a single sensor; however, the present disclosure is not limited thereto. For example, the pressure sensor 1640 may be implemented with a group of two or more sensors. The pressure sensor 1640 may also be implemented with a group of sensors arranged in a 3×2 array. The configuration of the pressure sensor 1640 is described in greater detail with reference to FIG. 17.

A haptic actuator 1650 receives a touch by an external tool, and provides the user with the haptic feedback. To this end, the haptic actuator 1660 may include a piezoelectric member and/or a diaphragm, etc.

The layer structure of the display of FIG. 16 is an example and may be modified in various forms. For example, the touch sensor 1620 may be directly formed on the back of the cover glass 1610 (i.e., a touch panel integrated with a cover glass). The touch sensor 1620 may be manufactured as a separate unit, and can be inserted between the cover glass 1610 and the display panel 1630 (i.e., add-on touch panel). The touch sensor 1620 may be directly formed on the display panel 1630 (i.e., on-cell touch panel), and the touch sensor may be included in the display panel 1630 (i.e., in-cell touch panel). The layer structure described above may further include an area type fingerprint sensor which is opaquely or transparently implemented.

Figure 17:
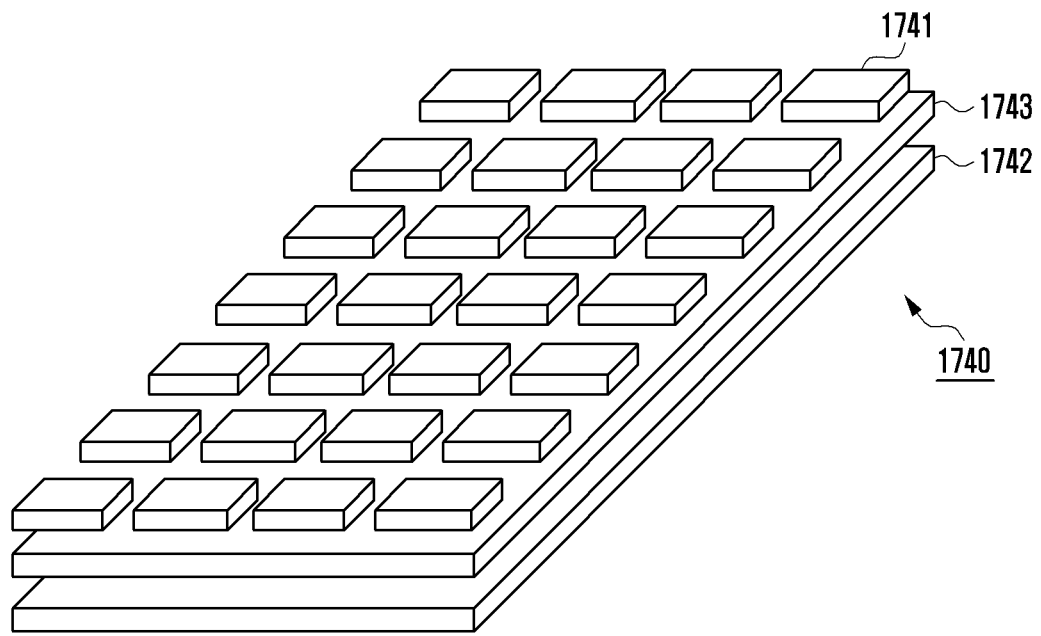
FIG. 17 is a block diagram of a pressure sensor included in an electronic device, according to an embodiment of the present disclosure.

FIG. 17 is a block diagram of a pressure sensor included in an electronic device, according to an embodiment of the present disclosure.

A pressure sensor 1740 can include a first electrode 1741, a second electrode 1742, and a dielectric layer 1743. The pressure sensor 1740 may correspond to the pressure sensor 1640 of FIG. 16. The configurations of the pressure sensor 1740 are not only limited to the one shown in FIG. 17.

The first electrode 1741 and/or the second electrode 1742 may be implemented in transparent or opaque form. For example, if the first electrode 1741 and/or the second electrode 1742 are/is implemented in opaque form, the conductive material of the first electrode 1741 and/or the second electrode 1742 (e.g., a conductive patch, conductive wire, etc.) may be Cu, Ag, Mg, Ti and/or opaque graphene. If the first electrode 1741 and/or the second electrode 1742 are/is implemented in transparent form the conductive material of the first electrode 1741 and/or the second electrode 1742 (e.g., a conductive patch, conductive wire, etc.) may be indium tin oxide (ITO), indium zinc oxide (IZO), Ag nanowire, metal mesh, transparent polymer conductive material and/or transparent graphene.

One of the first electrode 1741 and the second electrode 1742 may be implemented with a metal plate serving as the ground GND and the other may be in a repetitive pattern of polygons using the materials described above, which is called a self-capacitance type. As shown in FIG. 17, the first electrode 1741 may be implemented with a quadrangle conductive patch arranged in an array pattern, but it is not limited thereto.

As another example, one of the first electrode 1741 and the second electrode 1742 (e.g., transmitter Tx) may be formed as a pattern extending in a first direction, and the other (e.g., receiver Rx) may be formed as a pattern extending in a second direction crossing the first direction with a specific angle (e.g., a right angle), which is called a mutual-capacitance type. The first electrode 1741 and/or the second electrode 1742 may be implemented with a conductive wire bent in a strain gage pattern. For example, the first electrode 1741 may be directly formed on the back of the display panel (e.g., the display panel 1630 shown in FIG. 16). Alternatively, the first electrode 1741 may be printed on a flexible printed circuit board (FPCB) and the FPCB may be attached to one side of the display panel.

The dielectric layer 1743 may be implemented with a dielectric material having a specific capacitance, such as silicon foam, silicon membrane, optical clean adhesive (OCA), sponge, rubber, polymer (e.g., polycarbonate (PC) and/or polyethylene terephthalate (PET)), etc.

Figure 18:
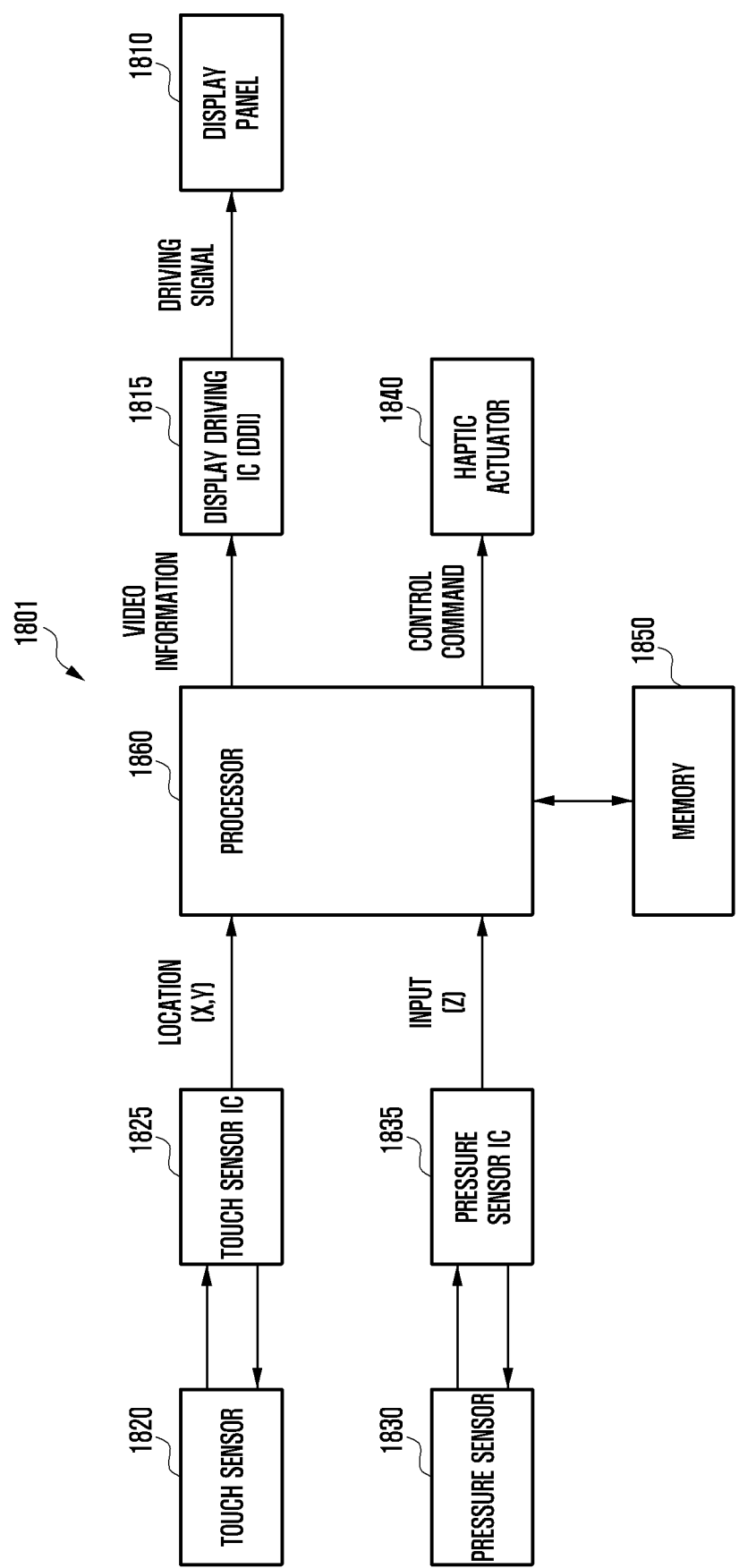
FIG. 18 is a block diagram of a configuration of an electronic device, according to an embodiment of the present disclosure.

FIG. 18 is a block diagram of an electronic device, according to an embodiment of the present disclosure.

With reference to FIG. 18, an electronic device 1801 can include a display panel 1810, a display driving IC (DDI) 1815, a touch sensor 1820, a touch sensor IC 1825, a pressure sensor 1830, a pressure sensor IC 1835, a haptic actuator 1840, a memory 1850 and a processor 1860. Components that were described above in the embodiments referring to FIGS. 1 to 3 are not explained below.

The display panel 1810 can receive a video driving signal provided from the DDI 1815. The display panel 1810 is capable of displaying various content and/or items (e.g., text, images (objects), videos, icons, function objects, symbols, etc.), based on the video driving signal. In the present disclosure, the display panel 1810 may be combined, in layers, with the touch sensor 1820 and/or the pressure sensor 1830 (FIG. 16), and may also be called a display. The display panel 1810 may operate in low power mode, or other suitable mode.

The DDI 1815 provides the display panel 1810 with a video driving signal, which corresponds to video information received from the processor (host) 1860, at a preset frame rate. The DDI 1815 drives the display panel 1810 in low power mode. Although it is not shown, the DDI 1815 can include a graphic RAM, an interface module, an image processing unit, a multiplexer, a display timing controller (T-con), a source driver, a gate driver, an oscillator, etc.

The touch sensor 1820 can change a physical quantity (e.g., voltage, light quantity, resistance, charge quantity, capacitance, etc.) specified by a user's touch. The touch sensor 1820 may be, in layers, disposed with the display panel 1810.

The touch sensor IC 1825 detects the change of a physical quantity in the touch sensor 1820, and calculates a location (X,Y) to which a touch is applied, based on the changed physical quantity. The touch sensor IC 1825 provides (or reports) the calculated location (coordinates) to the processor 1860.

If part of a user's body (e.g., finger), a stylus pen, etc., contacts the cover glass of the display, the coupling voltage between the transmitter Tx and the receiver Rx included in the touch sensor 1820 may vary. The touch sensor IC 1825 can detect the change in the coupling voltage and transferring coordinates (X, Y) of a location where a touch is applied to the processor 1860. The processor 1860 can obtain data regarding the coordinates (X, Y) as an event related to a user input.

The touch sensor IC 1825 may also be referred to as a touch IC, a touch screen IC, a touch controller, a touch screen controller IC, etc. If the electronic device is implemented without the touch sensor IC 1825, the processor 1860 may perform functions of the touch sensor IC 1825. The touch sensor IC 1825 and the processor 1860 may be implemented into a single configuration (e.g., one-chip or an SoC).

The pressure sensor 1830 detects pressure (or force) by an external tool. The pressure sensor 1830 can change in a physical quantity (e.g., capacitance) by a touch between the transmitter Tx (e.g., the first electrode 1741 of FIG. 17) and the receiver Rx (e.g., the second electrode 1742 of FIG. 17).

The pressure sensor IC 1835 detects the change of a physical quantity (e.g., capacitance, etc.) in the pressure sensor 1830, and calculates the pressure (Z) of a user's touch, based on the change of a physical quantity. The pressure sensor IC 1835 can provide the processor 1860 with the calculated pressure (Z) along with the location (X, Y) to which the touch is applied.

The pressure sensor IC 1835 may also be referred to as a force touch controller, a force sensor IC, a pressure panel IC, etc. The pressure sensor IC 1835 and the touch sensor IC 1825 may be implemented into a single configuration (e.g., one-chip or an SoC).

The haptic actuator 1840 provides the user with the haptic feedback according to the control command of the processor 1860. For example, when the haptic actuator 1840 receives a touch input from the user, the haptic actuator 1840 provides the user with the haptic feedback.

The memory 1850 stores data or commands related to operations/functions of components included in the electronic device 1801. For example, the memory 1850 stores at least one application program including a user interface set to display a plurality of items on the display. The memory 1850 can store storing instructions that enable the processor 1860 to perform various operations/functions described in the present disclosure.

The processor 1860 is electrically connected to components 1810-1850 included in the electronic device 1801, and can control the components 1810-1850 and perform operations related to communication or the data process.

The processor 1860 can launch (or execute) an application program or application for displaying a user interface on the display 1810. The processor 1860 can display an array of a plurality of items on the user interface displayed on the display 1810 in response to the launching of the application.

The processor 1860 can receive first data (data including location coordinates (X,Y) of a touched location) generated in and from the touch sensor 1820, and second data (data including the pressure (Z) of touch) generated in and from the pressure sensor 1830.

The processor 1860 can activate at least part of the pressure sensor 1830 while the display 1810 is turned off. Alternatively, the processor 1860 can enable at least partially the pressure sensor 1830 while the display 1810 is turned off. For example, although the electronic device 1801 can be in an awake state and/or components, such as the display 1810, etc., are in a turned-off state, or an idle state, the processor 1860 can activate part or all of the pressure sensor 1830. While the display 1810 is turned off or the electronic device 1801 is in an idle state, the processor 1860 may disable the touch sensor 1820 at least partially.

If a specified condition is satisfied while the display 1810 is turned off, the processor 1860 can activate at least part of the pressure sensor 1830. For example, the processor 1860 can activate the pressure sensor 1830 since a time, specified after the display 1810 is turned off, or until a specified time. If the processor 1860 detects a user's use via the gyro sensor, the proximity sensor, etc., the processor 1860 activates the pressure sensor 1830. The processor 1860 can also activate the pressure sensor 1830, according to one of a temperature that is less than a preset value during a specified time interval, a touch that is sensed via the touch panel, the electronic device 1801 approaches other external devices, and a stylus pen that is pulled out of the slot of the electronic device 1801. While an application (e.g., music player) operates in an idle state, the processor 1860 can activate the pressure sensor 1830.

If a specified condition is satisfied while the display 1810 is turned off, the processor 1860 may inactivate at least part of the pressure sensor 1830. For example, if the electronic device 1801 is in a pouch or a bag or if the front side of the electronic device 1810 is turned down, the processor 1860 can inactivate the pressure sensor 1830, using a proximity sensor, an illuminance sensor, an acceleration sensor, a gyro sensor, etc. If the electronic device 1801 is connected to an external device (e.g., a desktop computer), the processor 1860 can also inactivate the pressure sensor 1830.

While the display 1810 is turned off, the processor 1860 can inactivate only a specified area of the pressure sensor 1830. For example, in order to reduce the power consumption in an idle state, the processor 1860 inactivates a specified area of the pressure sensor 1830 (e.g., a bottom area of the pressure sensor 1830). If the pressure sensor 1830 is implemented with a group of two or more sensors, the processor 1860 may inactivate part of the two or more sensors.

As described above, if the pressure sensor 1830 is activated or enabled, the processor 1860 detects the pressure of touch using the pressure sensor 1830 while the electronic device 1801 is in an idle state. For example, while the display 1810 is turned off, the processor 1860 receives, from the pressure sensor 1830, data related to the pressure of touch that an external tool applies to the display 1810.

The processor 1860 determines whether the pressure of touch is greater than or equal to a selected level, based on the pressure-related data. If the processor 1860 ascertains that the pressure of touch is greater than or equal to a selected level, the processor 1860 performs a function without fully turning on the display 1810. For example, if the processor 1860 detects the pressure of touch greater than a specified level, the processor 1860 performs a function. In this case, the processor 1860 turns on part of the display 1810. The processor 1860 is capable of determining a function to be performed as described below, based on at least one of a level of strength and a location at which the pressure of touch that is detected, the number of locations, the speed, a direction, and the hold duration, related to a touch. For example, if the processor 1860 detects the pressure of touch at a location corresponding to the bottom of the display 1810, the processor 1860 may wake up the electronic device 1801. If the processor 1860 detects the pressure of touch at a location corresponding to the top left of the display 1810, the processor 1860 may control the speaker volume of the electronic device 1801. If the processor 1860 detects the pressure of touch at a location near a hardware device, such as an earphone jack, USB port, etc., the processor 1860 may perform a function related to the hardware device. If the processor 1860 detects the pressure of touch greater than or equal to a specified level of strength, the processor 1860 may control the electronic device 1801 to enter an emergency mode. The processor 1860 may perform different functions depending on the number of locations at which touches with pressure are simultaneously detected.

Although the embodiment shown in FIG. 18 is described in such a way that the pressure sensor 1830 provides the processor with data for pressure (Z), the present disclosure is not limited thereto. For example, if the pressure sensor 1830 is implemented with a group of two or more sensors, the processor 1860 can detect a location at which one of the two or more sensors changes in capacitance, and thus determining the location as a location to which the pressure of touch can be applied. For example, if the pressure sensor 1830 is implemented with a group of six sensors arranged as a 3×2 array, the processor 1860 can detects the variation of capacitance at the six sensors and locations at which the six sensors are arranged, respectively, and thus determines a location to which the pressure of touch is applied. That is, the processor 1860 may determine a location to which the pressure of touch is applied, without using the touch sensor 1830. If the processor 1860 detects the pressure of touch via the pressure sensor 1830, the processor 1860 activates the touch sensor 1820 and may thus detects a location to which the pressure of touch is applied, using the touch sensor 1820.

If the pressure sensor 1830 detects a first level of pressure by a touch, the processor 1860 performs a first function. The processor 1860 can determine a first function and perform the determined first function, based on at least one of a location at which a first level of pressure is detected, a level of strength, the number of locations, the speed, a direction, and the hold duration, related to a touch. The first level of pressure may be referred to as pressure of a specified range of strength.

If the pressure sensor 1830 detects a second level of pressure by a touch while performing the first function, the processor 1860 may perform a second function related to the first function. The processor 1860 can determine a second function, based on at least one of a location at which a second level of pressure is detected, a level of strength, the number of locations, the speed, a direction, and the hold duration, related to a touch. The second level of pressure (input) may be a pressure of a specified range of strength. The second level of pressure may be greater or less, in strength, than the first level of pressure. Alternatively, the second level of pressure may be identical, in strength, to the first level of pressure. If the processor 1860 detects the pressure of touch while performing the first function, the processor 1860 performs a second function related to the first executed function, thereby executing various functions by the pressure of one-dimensional (direct, primary) input. In addition, while the electronic device 1801 executes a function by a one-time touch, the electronic device 1801 executes a function, which differs from the function by the one-time touch, depending on a magnitude of pressure of touch pressing the electronic device 1801, thereby increasing the input convenience.

If the pressure sensor 1830 detects a first level of pressure by a touch, which is greater than a preset threshold, the processor 1860 can determine the initially generated object recognition area to be less than a reference size. If the pressure sensor 1830 detects a second level of pressure by a touch, which is less than a preset threshold, the processor 1860 can determine the initially generated object recognition area to be greater than a reference size.

It should be understood that the operations of the processor 1860 described herein are merely examples, and thus the present disclosure is not limited thereto. For example, the operations of the other processors described herein may also be performed by the processor 1860. Also, the operations described as operations of the electronic device can also be performed by the processor 1860.

As described above, the electronic device can activate the pressure sensor when the display is in a turned off state. If the electronic device receives inputs using the touch sensor when the display is in a turned off state, the error probability of malfunction against a user's intent is relatively high. Therefore, the electronic device receives inputs using a pressure sensor when the display is in a turned off state, thereby decreasing the occurrence of malfunction against a user's intent when the electronic device receives an input.

In recent years, in order to extend display or improve the design of electronic device, there is a growing interest in electronic devices without physical keys. While an electronic device is in an idle state, it receives inputs from a user, via a pressure sensor, and thus provides the user with user experience as if the user uses physical keys.

Figure 19:
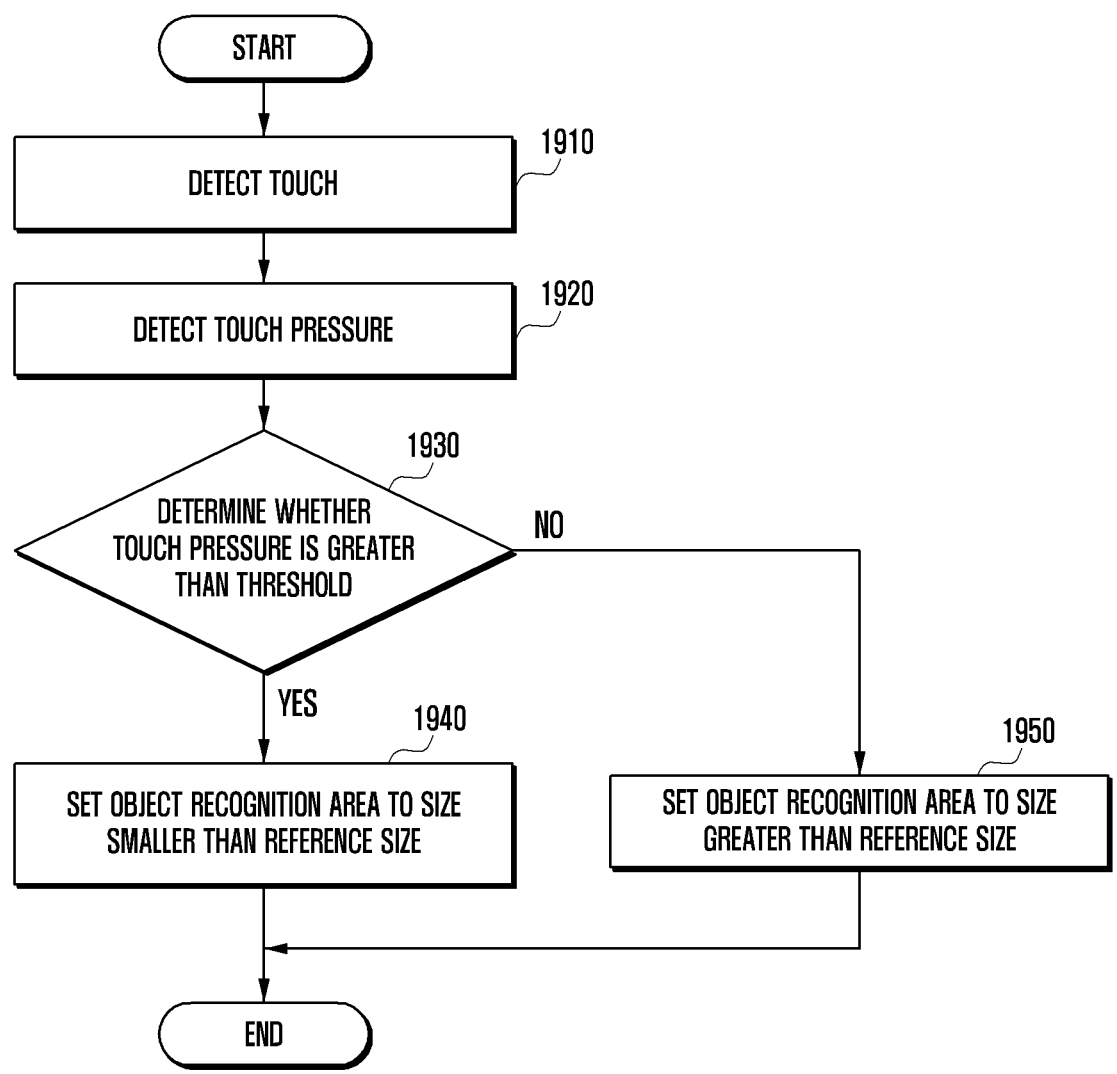
FIG. 19 is a flowchart of a touch input recognition method of an electronic device, according to an embodiment of the present disclosure.

FIG. 19 is a flowchart of a touch input recognition method of an electronic device, according to an embodiment of the present disclosure.

With reference to FIG. 19, the processor of an electronic device can sense a touch input by a touch signal transferred from the touch screen in step 1910. The processor senses the pressure of touch via the pressure sensor in step 1920. The processor determines whether a level of the sensed pressure of touch is greater than a preset threshold in step 1930. If the processor ascertains that a level of the sensed pressure of touch is greater than a preset threshold in step 1930, the processor sets the object recognition area so that it is generated to be less in size than a reference size in step 1940. On the other hand, if the processor ascertains that a level of the sensed pressure of touch is less than or equal to a preset threshold in step 1930, the processor sets the object recognition area so that it is generated to be greater in size than a reference size in step 1950.

A method of recognizing a touch input in an electronic device may be configured in such a way as to include receiving a touch input applied to a touch screen; setting, based on a first location touched on the touch screen, an area on the touch screen as a first size; decreasing the set area to a second size as a touch hold duration during which the touch input is maintained has elapsed; and recognizing the touch input as a cancel input if the touch input is released and if a second location from which the touch input is released is outside the set area.

At least part of the method (e.g., operations) or system (e.g., modules or functions) described herein can be implemented with instructions as program modules that are stored in a non-transitory computer-readable storage media (e.g., memory 130). One or more processors (e.g., the processor 120) can execute instructions, thereby performing the functions. Examples of the non-transitory computer-readable storage media include magnetic media, such as hard disks, floppy disks, and magnetic tape, optical media such as compact disc ROM (CD-ROM) disks and DVD, magneto-optical media, such as floptical disks, and built-in memory, etc. Examples of program instructions include codes created by a compiler, and codes executed by an interpreter. Modules or program modules may include one or more components, remove part of them described above, or include new components. The operations performed by modules, program modules, or the other components, may be executed in serial, parallel, repetitive or heuristic fashion. Part of the operations can be executed in any other order, skipped, or executed with additional operations.

The touch recognition method and an electronic device adapted to the method described herein are capable of correctly recognizing a touch input selecting an object, and preventing a touch input from being cancelled, against a user's intent. In addition, the touch recognition method and an electronic device adapted to the method described herein are capable of reflecting a user's intent for a touch input by adjusting the size of an object recognition area, thereby correctly recognizing touches and increasing the recognition efficiency of touch input.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
a touch screen;
a processor electrically connected to the touch screen and configured to:
receive a touch input applied to the touch screen;
detect a first location of the received touch input;
set a virtual area related to the detected first location on the touch screen, based on at least one condition including touch coordinates of the received touch input as a center point;
detect a touch hold duration corresponding to a time during which the touch input is received;
adjust the virtual area to decrease in size as the touch hold duration increases;
detect, when the received touch input is released, a second location on the touch screen from which the touch input is released;
determine whether the detected second location is within the virtual area;
when it is determined that the detected second location is within the virtual area or is outside of a display range of an object but within the adjusted virtual area, execute at least one function corresponding to the touch input; and
when it is determined that the detected second location is outside of the virtual area and the adjusted virtual area, cancel the touch input.

2. The electronic device of claim 1, wherein the processor is further configured to:
ascertain, when the first location is included within the display range of the object, that the object is selected;
control the touch screen to display information indicating that the object has been selected;
execute, when the second location is included within the display range of the object or the virtual area, at least one function corresponding to the selection of the object;
recognize, when the second location is outside the display range of the object or the virtual area, a touch selecting the object as an cancel input; and
control the touch screen to cancel the display of information indicating that the object has been selected.

3. The electronic device of claim 1, wherein the touch screen comprises an active area displaying a graphic user interface and an inactive area around the active area, and
wherein the processor is further configured to cancel the touch input, based on at least part of the determination as to whether the second location is within the touch recognition area created in the active area of the touch screen.

4. The electronic device of claim 3, wherein the processor is further configured to measure the touch hold duration from a timing when the touch signal is generated, and decreases the size of the touch recognition area generated in the active area as the touch hold duration elapses.

5. The electronic device of claim 1, wherein the processor is further configured to increase or decrease a reference size of the initially virtual area to, based on at least one a type of app executed on the screen of the touch screen, a size of the object, and a movement state of the electronic device.

6. The electronic device of claim 1, further comprising:
a sensor unit for sensing a movement state of the electronic device,
wherein the processor is further configured to adjust, when the degree of movement of the electronic device is greater than a threshold, the virtual area to be greater than a reference size, based on a sensed value provided by the sensor unit.

7. The electronic device of claim 1, further comprising a memory that includes reference information to classify application programs into a dynamic program,
wherein the processor is further configured to adjust the virtual area to be greater than a reference size, when a type of app, executed on the screen of the touch screen, is classified into a dynamic program related to one of a momentum and a movement of the electronic device.

8. The electronic device of claim 1, wherein the processor is further configured to detect a form of the object displayed on the touch screen and set the detected object to the form of the virtual area.

9. The electronic device of claim 1, wherein the processor is further configured to decrease the virtual area, gradually, by a certain size, each time when the touch hold duration elapses periodically at a certain time interval.

10. The electronic device of claim 1, further comprising:
a sensor configured to sense a pressure of the touch input, wherein the processor is further configured to:
set, when the pressure of the touch input at the first location is greater than a threshold, a size of the initially virtual area to have a size smaller than a reference size and set, when the pressure of the touch input at the first location is less than or equal to a threshold, the size of the initially virtual area to have a size greater than a reference size.

11. A method of recognizing a touch input in an electronic device comprising:
    receiving a touch input for selecting an object displayed on a touch screen of the electronic device;
    detecting a first location corresponding to the received touch input on the touch screen;
    setting a virtual area related to the detected first location, based on at least one condition including initial touch coordinates of the received touch input as a center point;
    detecting a touch hold duration corresponding to a time during which the touch input is received;
    adjusting the virtual area to decrease in size as the touch hold duration increases;
    detecting, when the touch input is released, a second location on the touch screen from which the touch input is released;
    determining whether the detected second location is within the virtual area;
    when it is determined that the detected second location is within the virtual area or is outside of a display range of an object but within the adjusted virtual area, executing at least one function corresponding to the touch input, and
    when it is determined that the detected second location is outside of the display range of the object and the adjusted virtual area, cancelling the touch input.

12. The method of claim 11, wherein determining whether at least one function is executed further comprises:
    executing at least one function corresponding to the selection of the object when the first location is included within the display range of the object, and when the second location is included within one of the display range of the object or the virtual area; and
    recognizing the touch input for selecting the object as a cancel input if when the second location is outside the display range of the object or the virtual area.

13. The method of claim 12, wherein detecting a first location further comprises:
    recognizing that the object has been selected when the first location is within the display range of the object displayed on the touch screen;
    displaying information, notifying that the object has been selected, on the touch screen; and
    cancelling, when a touch input for selecting the object is recognized as a cancel input, the display of information notifying that the object has been selected.

14. The method of claim 11, wherein setting the area related to the detected first location further comprises:
    adjusting a reference size of the virtual area to one of increase and decrease, based on at least one of a type of app executed on the screen of the touch screen, a size of the object, and a movement state of the electronic device.

15. The method of claim 11, wherein setting the area related to the first location further comprises:
    determining a movement state of the electronic device using a sensed value provided by a sensor unit of the electronic device; and
    adjusting, when a degree of movement of the electronic device is greater than a threshold, the virtual area to be greater than the reference size.

16. The method of claim 11, wherein receiving the touch input further comprises:
    measuring a pressure of the touch input;
    setting, based on the pressure of the touch input at the first location and when the pressure of a touch is greater than a preset threshold, the size of the initially virtual area to have a size smaller than a reference size; and
    setting, based on the pressure of the touch input at the first location and when the pressure of a touch is less than or equal to a preset threshold, the size of the initially virtual area to have a size greater than a reference size.

17. A method of recognizing a touch input in an electronic device comprising:
    receiving a touch input applied to a touch screen of the electronic device;
    setting, based on a first location touched on the touch screen, a virtual area on the touch screen as a first size, the first location including initial touch coordinates of the received touch input as a center point;
    decreasing the virtual area to a second size as a touch hold duration during which the touch input is maintained elapses; and
    recognizing the touch input as a cancel input when the touch input is released and when a second location from which the touch input is released is outside the virtual area and the second sizes.

* * * * *